United States Patent
Yao et al.

(10) Patent No.: US 12,394,999 B2
(45) Date of Patent: Aug. 19, 2025

(54) CHARGING CONTROL METHOD AND CHARGING CONTROL APPARATUS

(71) Applicant: HUAWEI TECHNOLOGIES CO., LTD., Guangdong (CN)

(72) Inventors: Xin Yao, Shenzhen (CN); Xiaohu He, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 841 days.

(21) Appl. No.: 17/685,353

(22) Filed: Mar. 2, 2022

(65) Prior Publication Data

US 2022/0190626 A1 Jun. 16, 2022

Related U.S. Application Data

(63) Continuation of application No. PCT/CN2020/113315, filed on Sep. 3, 2020.

(30) Foreign Application Priority Data

Sep. 3, 2019 (CN) .......................... 201910829318.3

(51) Int. Cl.
*H02J 7/00* (2006.01)
*H01M 10/44* (2006.01)

(52) U.S. Cl.
CPC ....... *H02J 7/007182* (2020.01); *H01M 10/44* (2013.01); *H02J 7/00032* (2020.01); *H02J 7/0047* (2013.01); *H02J 7/0029* (2013.01)

(58) Field of Classification Search
USPC ........................................................ 320/162
See application file for complete search history.

(56) References Cited

U.S. PATENT DOCUMENTS

| | | | | |
|---|---|---|---|---|
| 2011/0267009 | A1* | 11/2011 | Nakatsuji | H01M 10/48 320/152 |
| 2016/0181832 | A1* | 6/2016 | Hatano | H02J 7/00 320/162 |
| 2016/0301225 | A1 | 10/2016 | Shiraishi et al. | |

FOREIGN PATENT DOCUMENTS

| | | |
|---|---|---|
| CN | 101938150 A | 1/2011 |
| CN | 102163755 A | 8/2011 |
| CN | 102468656 A | 5/2012 |
| CN | 102577009 A | 7/2012 |
| CN | 103107378 A | 5/2013 |
| CN | 103707378 A | 4/2014 |
| CN | 105703024 A | 6/2016 |
| CN | 106026269 A | 10/2016 |
| CN | 106786877 A | 5/2017 |
| CN | 107196371 A | 9/2017 |
| CN | 108134424 A | 6/2018 |
| CN | 108235791 A | 6/2018 |
| JP | 2011211846 A | 10/2011 |

(Continued)

*Primary Examiner* — Samuel Berhanu

(57) ABSTRACT

A charging control method and a charging control apparatus are provided. The charging control method may be used to control a charging process of a secondary battery in a terminal device. According to the used charging control method, in the charging process, a battery voltage of the secondary battery may reach a voltage value greater than a limited charge voltage, so that a charging speed of the secondary battery may increase. In addition, in this method, overvoltage of the secondary battery is prevented by gradually reducing a current value of a charging current.

21 Claims, 5 Drawing Sheets

(56) References Cited

FOREIGN PATENT DOCUMENTS

| | | | |
|---|---|---|---|
| JP | 2016192849 | A | 11/2016 |
| WO | 2013073175 | A1 | 5/2013 |

* cited by examiner

CHARGING CONTROL METHOD AND CHARGING CONTROL APPARATUS

CROSS-REFERENCE TO RELATED APPLICATIONS

This application is a continuation of International Application No. PCT/CN2020/113315, filed on Sep. 3, 2020, which claims priority to Chinese Patent Application No. 201910829318.3, filed on Sep. 3, 2019. The disclosures of the aforementioned applications are hereby incorporated by reference in their entireties.

TECHNICAL FIELD

This application relates to the field of secondary battery charging technologies, and in particular, to a charging control method and a charging control apparatus.

BACKGROUND

A secondary battery, which may also be referred to as a storage battery or a rechargeable battery, is a battery that can continue to be used by activating an electrode active material through charging after discharge.

Currently, a conventional method for charging a secondary battery is constant current and constant voltage charging, that is, charging the secondary battery by using a charging current of a constant current value, so that a battery voltage of the secondary battery continuously increases until a limited charge voltage (limited charge voltage) is reached. Then, constant voltage charging is performed on the battery by using the limited charge voltage as a charging voltage. In a constant voltage charging phase, a current value of a battery current continuously decreases, and charging is disabled when the current value decreases to a preset current threshold. A voltage value of the limited charge voltage is generally a consensus in the industry. For example, for a secondary battery whose positive electrode is lithium cobalt acid LiCoO2 and negative electrode is graphite, a voltage value of a limited charge voltage is 4.4 V, which is currently a consensus in the industry.

However, in a conventional constant current and constant voltage charging process, a constant voltage charging phase generally occupies a lot of charging time, and a relatively small quantity of electricity is put into the secondary battery. This severely limits an overall charging speed of the secondary battery. In addition, the secondary battery is in a high voltage state for long time, and a cycle life of the secondary battery is also damaged to some extent.

SUMMARY

Embodiments of this application provide a charging control method and a charging control apparatus, so that an existing constant voltage charging phase is replaced with a charging mode in which a current value of a charging current is gradually reduced, and a battery voltage of a secondary battery is enabled to be greater than a conventional limited charge voltage, to increase an overall charging speed of the secondary battery on the basis of preventing overvoltage of the secondary battery. In this way, duration in which the secondary battery in a high voltage state may be shortened, thereby helping reduce damage to a cycle life of the secondary battery.

According to a first aspect, an embodiment of this application provides a charging control method. The charging control method may be applied to a system apparatus, such as a system on chip (system on chip, SoC) or a power management unit (power management unit, PMU), that is in a terminal device and that can manage a charging chip. For example, the charging control method mainly includes: sending first control information to the charging chip, where the first control information may indicate the charging chip to perform constant current charging on a to-be-charged secondary battery by using a first charging current; sequentially performing an adjustment step for each charging current, where the adjustment step mainly includes: obtaining a voltage value of a battery voltage of the secondary battery detected by the charging chip; and sending second control information to the charging chip after the voltage value of the battery voltage of the secondary battery reaches a first voltage threshold corresponding to a $k^{th}$ charging current, where the second control information may indicate the charging chip to continue to perform constant current charging on the secondary battery by using a $(k+1)^{th}$ charging current; a current value of the $(k+1)^{th}$ charging current is less than a current value of the $k^{th}$ charging current, the first voltage threshold corresponding to the $k^{th}$ charging current is greater than a limited charge voltage, and a difference obtained by subtracting a voltage value of the limited charge voltage from the first voltage threshold corresponding to the $k^{th}$ charging current is not greater than a safe voltage difference corresponding to the $k^{th}$ charging current; k is each positive integer from 1 to m, and a current value of an $(m+1)^{th}$ charging current meets a charging cut-off condition; and sending termination information to the charging chip, where the termination information may indicate the charging chip to end charging.

In the foregoing method, the adjustment step may be performed for a plurality of times. That the first voltage threshold corresponding to the $k^{th}$ charging current is greater than the voltage value of the limited charge voltage may also be understood as a meaning that in the used charging method provided in this embodiment of this application, the voltage value of the battery voltage of the secondary battery in a charging process may exceed the voltage value of the limited charge voltage. Therefore, a charging speed of the secondary battery may increase as a whole. In addition, the difference obtained by subtracting the voltage value of the limited charge voltage from the first voltage threshold corresponding to the $k^{th}$ charging current is not greater than the safe voltage difference corresponding to the $k^{th}$ charging current. Therefore, when the secondary battery is charged by using the $k^{th}$ charging current, even if the voltage value of the battery voltage of the secondary battery reaches the voltage value of the limited charge voltage, overvoltage of the secondary battery is not caused. After the voltage value of the battery voltage reaches the first voltage threshold, constant current charging continues to be performed on the secondary battery by using the $(k+1)^{th}$ charging current with a lower current value, and a decrease in the current value of the charging current makes the battery voltage of the secondary battery decrease accordingly. Further, constant current charging continues to be performed on the secondary battery by keeping using the $(k+1)^{th}$ charging current, and the battery voltage value of the secondary battery increases again after decreasing. The adjustment step is repeated until the $(m+1)^{th}$ charging current meets the charging cut-off condition, and it may be considered that a quantity of electricity that is put into the secondary battery reaches a rated quantity of electricity. In this case, the charging chip may be controlled to end charging.

In a possible implementation, the safe voltage difference corresponding to the $k^{th}$ charging current is obtained based on a voltage value of a voltage drop due to internal resistance of the secondary battery when the secondary battery is charged by using the $k^{th}$ charging current.

When the secondary battery is charged by using the charging current, even if the voltage value of the battery voltage of the secondary battery is greater than the limited charge voltage, an effective charging voltage used to drive a battery energy storage reaction inside the secondary battery is still not greater than the limited charge voltage because of the voltage drop due to internal resistance in the secondary battery. In this embodiment of this application, the safe voltage difference corresponding to the $k^{th}$ charging current is obtained based on the voltage value of the voltage drop due to internal resistance of the secondary battery when the secondary battery is charged by using the $k^{th}$ charging current. In this way, when the secondary battery is charged by using the $k^{th}$ charging current, even if the battery voltage of the secondary battery reaches the first voltage threshold corresponding to the $k^{th}$ charging current, the effective charging voltage used to drive the battery energy storage reaction inside the secondary battery is still not greater than the limited charge voltage, thereby helping prevent overvoltage of the secondary battery.

In a possible implementation, the charging cut-off condition may include that m+1 is equal to a threshold of a quantity of times. In another possible implementation, the charging cut-off condition may include that the current value of the $(m+1)^{th}$ charging current is not greater than a current threshold, and a current value of an $m^{th}$ charging current is greater than the current threshold.

In a possible implementation, before the first control information is sent to the charging chip, startup information may be further sent to the charging chip. The startup information may indicate the charging chip to perform constant current charging on the secondary battery by using a charging current of a preset current value, and the preset current value is not less than a current value of the first charging current. The voltage value of the battery voltage of the secondary battery may be obtained, and the first control information may be sent to the charging chip after it is determined that the voltage value of the secondary battery reaches the limited charge voltage.

According to the foregoing used method, the preset current value is not less than the current value of the first charging current. Therefore, the charging current of the preset current value may quickly increase the voltage value of the battery voltage of the secondary battery to the limited charge voltage. After the voltage value of the battery voltage of the secondary battery reaches the limited charge voltage, constant current charging continues to be performed on the secondary battery by using the first charging current. If the preset current value is greater than the current value of the first charging current, the first voltage threshold corresponding to the current value of the first charging current is smaller, thereby helping further prevent overvoltage of the secondary battery.

In a possible implementation, the sending the first control information to the charging chip after determining that the voltage value of the secondary battery reaches the limited charge voltage includes: sending third control information to the charging chip after determining that the voltage value of the battery voltage reaches the voltage value of the limited charge voltage, where the third control information may indicate the charging chip to perform constant voltage charging on the secondary battery by using a first charging voltage, and a voltage value of the first charging voltage is the voltage value of the limited charge voltage; and sending the first control information to the charging chip after determining that a current value of a current charging current drops to the current value of the first charging current.

In a possible implementation, before the voltage value of the battery voltage of the secondary battery exceeds the voltage value of the limited charge voltage, an internal resistance value of the secondary battery may be further obtained; a voltage value of a voltage drop due to internal resistance of the secondary battery when the secondary battery is charged by using the first charging current may be calculated based on the internal resistance value of the secondary battery and the current value of the first charging current; and a first voltage threshold corresponding to the first charging current may be calculated based on the voltage value of the voltage drop due to internal resistance of the secondary battery and the voltage value of the limited charge voltage.

For example, in a process of performing constant current charging by using the charging current of the preset current value, the internal resistance value of the secondary battery may be obtained in the following manner: obtaining a first voltage value of a current battery voltage of the secondary battery; sending fourth control information to the charging chip, where the fourth control information is used to indicate the charging chip to perform constant current charging on the secondary battery by using a charging current of a first current value, and the first current value is less than the preset current value; obtaining a second voltage value of a current battery voltage of the secondary battery, and sending fifth control information to the charging chip, where the fifth control information may indicate the charging chip to perform constant current charging on the secondary electrode by using the charging current of the preset current value or the first charging current; and calculating the internal resistance value of the secondary battery based on a voltage difference obtained by subtracting the second voltage value from the first voltage value and a current difference obtained by subtracting the first current value from the preset current value.

Specifically, if the internal resistance value of the secondary battery is obtained before the voltage value of the battery voltage reaches the limited charge voltage, the fifth control information may be used to indicate the charging chip to continue to perform constant current charging on the secondary battery by using the charging current of the preset current value. If the voltage value of the battery voltage reaches the limited charge voltage, the fifth control information may be used to indicate the charging chip to continue to perform constant current charging on the secondary battery by using the first charging current.

During cycle use of the secondary battery, the internal resistance value of the secondary battery varies with an increase in a quantity of repeated charging and discharging times. According to the foregoing used method, in a process of charging the secondary battery every time, a current internal resistance value of the secondary battery may be detected again, thereby helping improve accuracy of the internal resistance value of the secondary battery.

In a possible implementation, the first voltage threshold corresponding to the $k^{th}$ charging current is obtained based on the following method: calculating, based on the internal resistance value of the secondary battery and the current value of the $k^{th}$ charging current, the voltage value of the voltage drop due to internal resistance of the secondary battery when the secondary battery is charged by using the $k^{th}$ charging current; and calculating, based on the voltage value of the voltage drop due to internal resistance of the secondary battery and the voltage value of the limited charge voltage, the first voltage threshold corresponding to the $k^{th}$ charging current.

In a possible implementation, the current value of the $(k+1)^{th}$ charging current is obtained based on the following method: determining the current value of the $(k+1)^{th}$ charging current based on a preset proportion; determining a reduction amplitude corresponding to a current interval to which the current value of the $k^{th}$ charging current belongs, and determining the current value of the $(k+1)^{th}$ charging current based on the reduction amplitude; or obtaining a battery temperature of the secondary battery, determining a reduction amplitude corresponding to a temperature interval in which the battery temperature is located, and determining the current value of the $(k+1)^{th}$ charging current based on the reduction amplitude.

According to a second aspect, an embodiment of this application provides a charging method. The method may be applied to a charging apparatus, such as a charging chip, in a terminal device. In a charging process, the charging chip may provide a charging current (charging voltage) for a secondary battery under control of a charging control apparatus, and the charging control apparatus may be a SoC, a PMU, or the like of the terminal device.

For example, the charging method mainly includes: receiving first control information sent by the charging control apparatus, and performing, based on the first control information, constant current charging on a to-be-charged secondary battery by using a first charging current; detecting a voltage value of a battery voltage of the secondary battery, and providing the detected voltage value of the battery voltage of the secondary battery for the charging control apparatus; after receiving second control information sent by the charging control apparatus, continuing to perform constant current charging on the secondary battery by using a $(k+1)^{th}$ charging current based on the second control information, where a current value of the $(k+1)^{th}$ charging current is less than a current value of a $k^{th}$ charging current, a first voltage threshold corresponding to the $k^{th}$ charging current is greater than a limited charge voltage, and a difference obtained by subtracting a voltage value of the limited charge voltage from the first voltage threshold corresponding to the $k^{th}$ charging current is not greater than a safe voltage difference corresponding to the $k^{th}$ charging current; k is each positive integer from 1 to m, and a current value of an $(m+1)^{th}$ charging current meets a charging cut-off condition; after receiving termination information sent by the charging control apparatus, ending charging based on the termination information.

In a possible implementation, the safe voltage difference corresponding to the $k^{th}$ charging current is obtained based on a voltage value of a voltage drop due to internal resistance of the secondary battery when the secondary battery is charged by using the $k^{th}$ charging current.

In a possible implementation, the charging cut-off condition includes: m+1 is equal to a threshold of a quantity of times; or the current value of the $(m+1)^{th}$ charging current is not greater than a current threshold, and a current value of an $m^{th}$ charging current is greater than the current threshold.

In a possible implementation, before the receiving first control information sent by the charging control apparatus, the method further includes: receiving startup information sent by the charging control apparatus, and performing constant current charging on the secondary battery based on the startup information by using a charging current of a preset current value, where the preset current value is not less than a current value of the first charging current; and detecting the voltage value of the battery voltage of the secondary battery, and providing the detected voltage value of the battery voltage of the secondary battery for the charging control apparatus.

In a possible implementation, before the receiving first control information sent by the charging control apparatus, the method further includes: receiving third control information sent by the charging control apparatus, and performing constant voltage charging on the secondary battery based on the third control information by using a first charging voltage, where a voltage value of the first charging voltage is the voltage value of the limited charge voltage.

According to a third aspect, an embodiment of this application further provides a charging control apparatus, including a transmission unit and an adjustment unit. The transmission unit is configured to send first control information to a charging chip, where the first control information may indicate the charging chip to perform constant current charging on a to-be-charged secondary battery by using a first charging current. The adjustment unit is configured to sequentially perform an adjustment step for each charging current, where the adjustment step includes: obtaining, by using the transmission unit, a voltage value of a battery voltage of the secondary battery detected by the charging chip; and after the voltage value of the battery voltage of the secondary battery reaches a first voltage threshold corresponding to a $k^{th}$ charging current, controlling the transmission unit to send second control information to the charging chip, where the second control information may indicate the charging chip to continue to perform constant current charging on the secondary battery by using a $(k+1)^{th}$ charging current. A current value of the $(k+1)^{th}$ charging current is less than a current value of the $k^{th}$ charging current, the first voltage threshold corresponding to the $k^{th}$ charging current is greater than a limited charge voltage, and a difference obtained by subtracting a voltage value of the limited charge voltage from the first voltage threshold corresponding to the $k^{th}$ charging current is not greater than a safe voltage difference corresponding to the $k^{th}$ charging current; k is each positive integer from 1 to m, and a current value of an $(m+1)^{th}$ charging current meets a charging cut-off condition. The transmission unit is further configured to send termination information to the charging chip, where the termination information may indicate the charging chip to end charging.

In a possible implementation, the safe voltage difference corresponding to the $k^{th}$ charging current is obtained based on a voltage value of a voltage drop due to internal resistance of the secondary battery when the secondary battery is charged by using the $k^{th}$ charging current.

In a possible implementation, the charging cut-off condition includes: m+1 is equal to a threshold of a quantity of times; or the current value of the $(m+1)^{th}$ charging current is not greater than a current threshold, and a current value of an $m^{th}$ charging current is greater than the current threshold.

In a possible implementation, the transmission unit may further send startup information to the charging chip. The startup information may indicate the charging chip to perform constant current charging on the secondary battery by using a charging current of a preset current value, and the preset current value is not less than a current value of the first charging current. The adjustment unit may further obtain the voltage value of the battery voltage of the secondary battery by using the transmission unit, and after determining that the voltage value of the secondary battery reaches the limited charge voltage, control the transmission unit to send the first control information to the charging chip.

In a possible implementation, the adjustment unit is specifically configured to: after determining that the voltage value of the battery voltage reaches the voltage value of the limited charge voltage, control the transmission unit to send third control information to the charging chip, where the third control information may indicate the charging chip to perform constant voltage charging on the secondary battery by using a first charging voltage, and a voltage value of the first charging voltage is the voltage value of the limited charge voltage; and after determining that a current value of a current charging current drops to the current value of the first charging current, control the transmission unit to send the first control information to the charging chip.

In a possible implementation, the adjustment unit is further configured to: obtain an internal resistance value of the secondary battery; calculate, based on the internal resistance value of the secondary battery and the current value of the first charging current, a voltage value of a voltage drop due to internal resistance of the secondary battery when the secondary battery is charged by using the first charging current; and calculate, based on the voltage value of the voltage drop due to internal resistance of the secondary battery and the voltage value of the limited charge voltage, a first voltage threshold corresponding to the first charging current.

For example, the adjustment unit may obtain the internal resistance value of the secondary battery in the following manner: obtaining a first voltage value of a current battery voltage of the secondary battery; sending fourth control information to the charging chip, where the fourth control information is used to indicate the charging chip to perform constant current charging on the secondary battery by using a charging current of a first current value, and the first current value is less than the preset current value; obtaining a second voltage value of a current battery voltage of the secondary battery, and sending fifth control information to the charging chip, where the fifth control information may indicate the charging chip to perform constant current charging on the secondary electrode by using the charging current of the preset current value or the first charging current; and calculating the internal resistance value of the secondary battery based on a voltage difference obtained by subtracting the second voltage value from the first voltage value and a current difference obtained by subtracting the first current value from the preset current value.

Specifically, if the internal resistance value of the secondary battery is obtained before the voltage value of the battery voltage reaches the limited charge voltage, the fifth control information may be used to indicate the charging chip to continue to perform constant current charging on the secondary battery by using the charging current of the preset current value. If the voltage value of the battery voltage reaches the limited charge voltage, the fifth control information may be used to indicate the charging chip to continue to perform constant current charging on the secondary battery by using the first charging current.

In a possible implementation, the first voltage threshold corresponding to the $k^{th}$ charging current is obtained based on the following method: calculating, based on the internal resistance value of the secondary battery and the current value of the $k^{th}$ charging current, the voltage value of the voltage drop due to internal resistance of the secondary battery when the secondary battery is charged by using the $k^{th}$ charging current; and calculating, based on the voltage value of the voltage drop due to internal resistance of the secondary battery and the voltage value of the limited charge voltage, the first voltage threshold corresponding to the $k^{th}$ charging current.

In a possible implementation, the current value of the $(k+1)^{th}$ charging current is obtained based on the following method: determining the current value of the $(k+1)^{th}$ charging current based on a preset proportion; determining a reduction amplitude corresponding to a current interval to which the current value of the $k^{th}$ charging current belongs, and determining the current value of the $(k+1)^{th}$ charging current based on the reduction amplitude; or obtaining a battery temperature of the secondary battery, determining a reduction amplitude corresponding to a temperature interval in which the battery temperature is located, and determining the current value of the $(k+1)^{th}$ charging current based on the reduction amplitude.

According to a fourth aspect, an embodiment of this application further provides a charging apparatus. The charging apparatus may be a charging chip. The charging apparatus includes a control unit, a detection unit, and a charging unit. The charging unit is configured to provide a charging current for a to-be-charged secondary battery under control of the control unit. The control unit is configured to receive first control information sent by a charging control apparatus, and control, based on the first control information, the charging unit to perform constant current charging on the to-be-charged secondary battery by using a first charging current. The detection unit is configured to detect a voltage value of a battery voltage of the secondary battery, and provide the detected voltage value of the battery voltage of the secondary battery for the charging control apparatus. The control unit is further configured to: after receiving second control information sent by the charging control apparatus, control, based on the second control information, the charging unit to continue to perform constant current charging on the secondary battery by using a $(k+1)^{th}$ charging current, where a current value of the $(k+1)^{th}$ charging current is less than a current value of a $k^{th}$ charging current, a first voltage threshold corresponding to the $k^{th}$ charging current is greater than a limited charge voltage, and a difference obtained by subtracting a voltage value of the limited charge voltage from the first voltage threshold corresponding to the $k^{th}$ charging current is not greater than a safe voltage difference corresponding to the $k^{th}$ charging current; k is each positive integer from 1 to m, and a current value of an $(m+1)^{th}$ charging current meets a charging cut-off condition; and after receiving termination information sent by the charging control apparatus, control, based on the termination information, the charging unit to end charging.

In a possible implementation, the safe voltage difference corresponding to the $k^{th}$ charging current is obtained based on a voltage value of a voltage drop due to internal resistance of the secondary battery when the secondary battery is charged by using the $k^{th}$ charging current.

In a possible implementation, the charging cut-off condition includes: m+1 is equal to a threshold of a quantity of times; or the current value of the $(m+1)^{th}$ charging current is not greater than a current threshold, and a current value of an $m^{th}$ charging current is greater than the current threshold.

In a possible implementation, the control unit is further configured to: receive startup information sent by the charging control apparatus, and control, based on the startup information, the charging unit to perform constant current charging on the secondary battery by using a charging current of a preset current value, where the preset current value is not less than a current value of the first charging current.

In a possible implementation, the control unit is further configured to: receive third control information sent by the charging control apparatus, and control, based on the third control information, the charging unit to perform constant voltage charging on the secondary battery by using a first charging voltage, where a voltage value of the first charging voltage is the voltage value of the limited charge voltage.

According to a fifth aspect, an embodiment of this application further provides a charging control apparatus, including an interface circuit and an adjustment circuit. The interface circuit is configured to send first control information to a charging chip, where the first control information may indicate the charging chip to perform constant current charging on a to-be-charged secondary battery by using a first charging current. The adjustment circuit is configured to sequentially perform an adjustment step for each charging current, where the adjustment step includes: obtaining, by using the interface circuit, a voltage value of a battery voltage of the secondary battery detected by the charging chip; and after the voltage value of the battery voltage of the secondary battery reaches a first voltage threshold corresponding to a $k^{th}$ charging current, controlling the interface circuit to send second control information to the charging chip, where the second control information may indicate the charging chip to continue to perform constant current charging on the secondary battery by using a $(k+1)^{th}$ charging current. A current value of the $(k+1)^{th}$ charging current is less than a current value of the $k^{th}$ charging current, the first voltage threshold corresponding to the $k^{th}$ charging current is greater than a limited charge voltage, and a difference obtained by subtracting a voltage value of the limited charge voltage from the first voltage threshold corresponding to the $k^{th}$ charging current is not greater than a safe voltage difference corresponding to the $k^{th}$ charging current; k is each positive integer from 1 to m, and a current value of an $(m+1)^{th}$ charging current meets a charging cut-off condition. The interface circuit is further configured to send termination information to the charging chip, where the termination information may indicate the charging chip to end charging.

In a possible implementation, the safe voltage difference corresponding to the $k^{th}$ charging current is obtained based on a voltage value of a voltage drop due to internal resistance of the secondary battery when the secondary battery is charged by using the $k^{th}$ charging current.

In a possible implementation, the charging cut-off condition includes: m+1 is equal to a threshold of a quantity of times; or the current value of the $(m+1)^{th}$ charging current is not greater than a current threshold, and a current value of an $m^{th}$ charging current is greater than the current threshold.

In a possible implementation, the interface circuit may further send startup information to the charging chip. The startup information may indicate the charging chip to perform constant current charging on the secondary battery by using a charging current of a preset current value, and the preset current value is not less than a current value of the first charging current. The adjustment circuit may further obtain the voltage value of the battery voltage of the secondary battery by using the interface circuit, and after determining that the voltage value of the secondary battery reaches the limited charge voltage, control the interface circuit to send the first control information to the charging chip.

In a possible implementation, the adjustment circuit is specifically configured to: after determining that the voltage value of the battery voltage reaches the voltage value of the limited charge voltage, control the interface circuit to send third control information to the charging chip, where the third control information may indicate the charging chip to perform constant voltage charging on the secondary battery by using a first charging voltage, and a voltage value of the first charging voltage is the voltage value of the limited charge voltage; and after determining that a current value of a current charging current drops to the current value of the first charging current, control the interface circuit to send the first control information to the charging chip.

In a possible implementation, the adjustment circuit is further configured to: obtain an internal resistance value of the secondary battery; calculate, based on the internal resistance value of the secondary battery and the current value of the first charging current, a voltage value of a voltage drop due to internal resistance of the secondary battery when the secondary battery is charged by using the first charging current; and calculate, based on the voltage value of the voltage drop due to internal resistance of the secondary battery and the voltage value of the limited charge voltage, a first voltage threshold corresponding to the first charging current.

For example, the adjustment circuit may obtain the internal resistance value of the secondary battery in the following manner: obtaining a first voltage value of a current battery voltage of the secondary battery; sending fourth control information to the charging chip, where the fourth control information is used to indicate the charging chip to perform constant current charging on the secondary battery by using a charging current of a first current value, and the first current value is less than the preset current value; obtaining a second voltage value of a current battery voltage of the secondary battery, and sending fifth control information to the charging chip, where the fifth control information may indicate the charging chip to perform constant current charging on the secondary electrode by using the charging current of the preset current value or the first charging current; and calculating the internal resistance value of the secondary battery based on a voltage difference obtained by subtracting the second voltage value from the first voltage value and a current difference obtained by subtracting the first current value from the preset current value.

Specifically, if the internal resistance value of the secondary battery is obtained before the voltage value of the battery voltage reaches the limited charge voltage, the fifth control information may be used to indicate the charging chip to continue to perform constant current charging on the secondary battery by using the charging current of the preset current value. If the voltage value of the battery voltage reaches the limited charge voltage, the fifth control information may be used to indicate the charging chip to continue to perform constant current charging on the secondary battery by using the first charging current.

In a possible implementation, the first voltage threshold corresponding to the $k^{th}$ charging current is obtained based on the following method: calculating, based on the internal resistance value of the secondary battery and the current value of the $k^{th}$ charging current, the voltage value of the voltage drop due to internal resistance of the secondary battery when the secondary battery is charged by using the $k^{th}$ charging current; and calculating, based on the voltage value of the voltage drop due to internal resistance of the secondary battery and the voltage value of the limited charge voltage, the first voltage threshold corresponding to the $k^{th}$ charging current.

In a possible implementation, the current value of the $(k+1)^{th}$ charging current is obtained based on the following method: determining the current value of the $(k+1)^{th}$ charging current based on a preset proportion; determining a reduction amplitude corresponding to a current interval to which the current value of the $k^{th}$ charging current belongs, and determining the current value of the $(k+1)^{th}$ charging current based on the reduction amplitude; or obtaining a battery temperature of the secondary battery, determining a reduction amplitude corresponding to a temperature interval in which the battery temperature is located, and determining the current value of the $(k+1)^{th}$ charging current based on the reduction amplitude.

According to a sixth aspect, an embodiment of this application further provides a charging apparatus. The charging apparatus may be a charging chip. The charging apparatus includes a control circuit, a detection circuit, and a charging circuit. The charging circuit is configured to provide a charging current for a to-be-charged secondary battery under control of the control circuit. The control circuit is configured to receive first control information sent by a charging control apparatus, and control, based on the first control information, the charging circuit to perform constant current charging on the to-be-charged secondary battery by using a first charging current. The detection circuit is configured to detect a voltage value of a battery voltage of the secondary battery, and provide the detected voltage value of the battery voltage of the secondary battery for the charging control apparatus. The control circuit is further configured to: after receiving second control information sent by the charging control apparatus, control, based on the second control information, the charging circuit to continue to perform constant current charging on the secondary battery by using a $(k+1)^{th}$ charging current, where a current value of the $(k+1)^{th}$ charging current is less than a current value of a $k^{th}$ charging current, a first voltage threshold corresponding to the $k^{th}$ charging current is greater than a limited charge voltage, and a difference obtained by subtracting a voltage value of the limited charge voltage from the first voltage threshold corresponding to the $k^{th}$ charging current is not greater than a safe voltage difference corresponding to the $k^{th}$ charging current; k is each positive integer from 1 to m, and a current value of an $(m+1)^{th}$ charging current meets a charging cut-off condition; and after receiving termination information sent by the charging control apparatus, control, based on the termination information, the charging circuit to end charging.

In a possible implementation, the safe voltage difference corresponding to the $k^{th}$ charging current is obtained based on a voltage value of a voltage drop due to internal resistance of the secondary battery when the secondary battery is charged by using the $k^{th}$ charging current.

In a possible implementation, the charging cut-off condition includes: m+1 is equal to a threshold of a quantity of times; or the current value of the $(m+1)^{th}$ charging current is not greater than a current threshold, and a current value of an $m^{th}$ charging current is greater than the current threshold.

In a possible implementation, the control circuit is further configured to: receive startup information sent by the charging control apparatus, and control, based on the startup information, the charging circuit to perform constant current charging on the secondary battery by using a charging current of a preset current value, where the preset current value is not less than a current value of the first charging current.

In a possible implementation, the control circuit is further configured to: receive third control information sent by the charging control apparatus, and control, based on the third control information, the charging circuit to perform constant voltage charging on the secondary battery by using a first charging voltage, where a voltage value of the first charging voltage is the voltage value of the limited charge voltage.

According to a seventh aspect, an embodiment of this application further provides a terminal device. The terminal device includes a secondary battery, the charging control apparatus provided in any one of the fifth aspect, and the charging apparatus provided in any implementation of the sixth aspect. The secondary battery is coupled to the charging apparatus, and the charging apparatus may charge the secondary battery under control of the charging control apparatus.

These aspects or other aspects of this application are clearer and easier to understand in description of the following embodiments.

DESCRIPTION OF EMBODIMENTS

To make objectives, technical solutions, and advantages of this application clearer, the following further describes this application in detail with reference to the accompanying drawings. A specific operation method in a method embodiment may also be applied to an apparatus embodiment or a system embodiment. It should be noted that, in description of this application, "at least one" means one or more, and "a plurality of" means two or more. In view of this, "a plurality of" may also be understood as "at least two" in the embodiments of the present embodiment of invention. The term "and/or" describes an association relationship for describing associated objects and indicates that three relationships may exist. For example, A and/or B may indicate the following three cases: Only A exists, both A and B exist, and only B exists. In addition, unless otherwise specified, the character "l" generally indicates an "or" relationship between associated objects. In addition, it should be understood that in the description of this application, terms such as "first" and "second" are merely used for distinguishing and description, but should not be understood as indicating or implying relative importance, or should not be understood as indicating or implying a sequence. "Coupling" refers to a direct or indirect connection mode. For example, A and B are coupled, indicating that A and B are directly electrically connected, or indicating that A and B are electrically connected by using another electrical element C.

Figure 1:
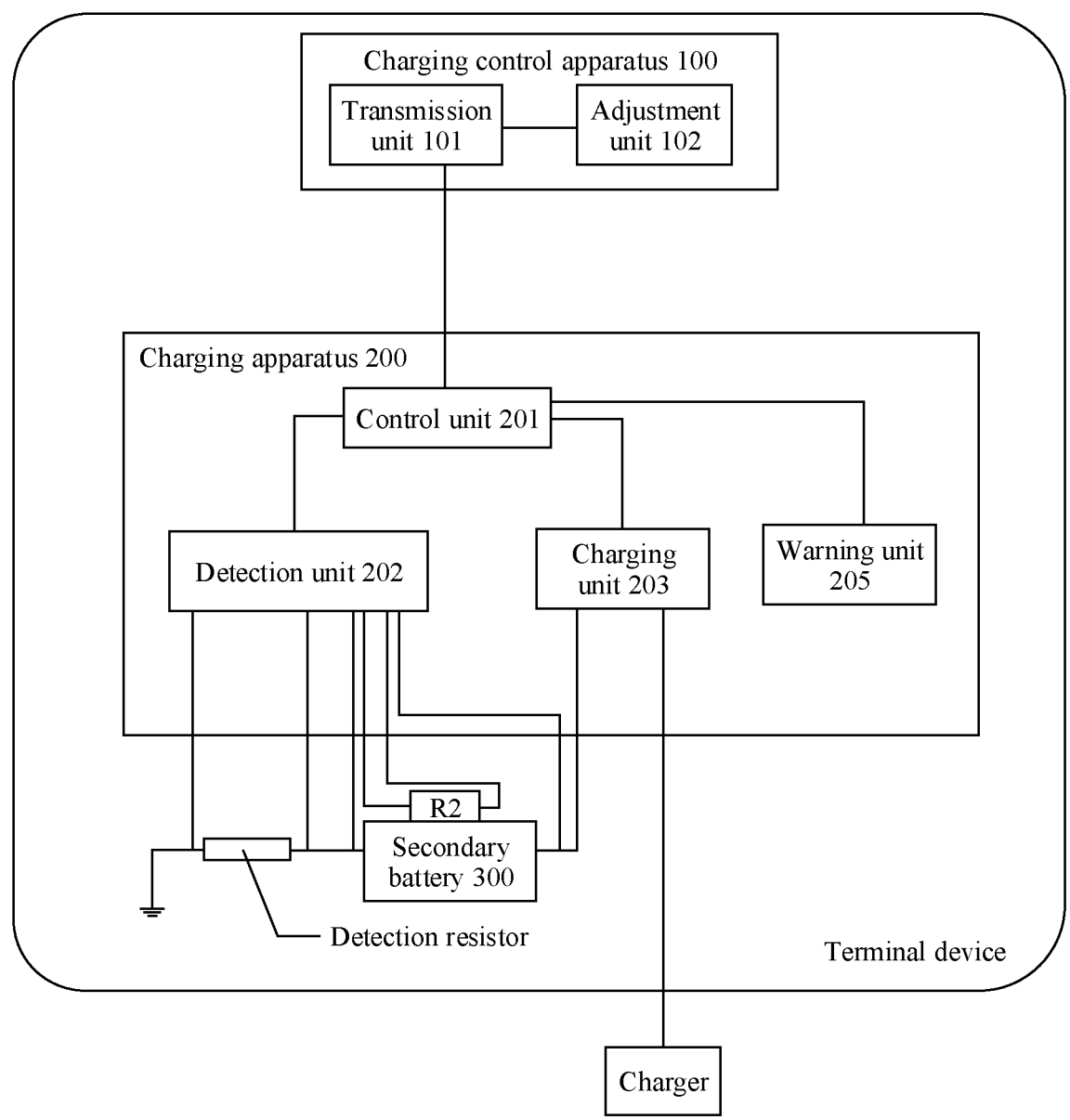
FIG. 1 is a schematic diagram of a structure of a terminal device according to an embodiment of this application.

A secondary battery (secondary battery) is also referred to as a storage battery, and comprises a battery that may be charged or recharged by applying a current or a voltage, to various terminal devices such as a smartphone or a tablet computer. FIG. 1 is an example of a schematic diagram of a structure of a terminal device. As shown in FIG. 1, the terminal device includes a charging control apparatus 100, a charging apparatus 200 coupled to the charging control apparatus 100, and a secondary battery 300 coupled to the charging apparatus 200.

The charging control apparatus 100 may be an apparatus, such as a SoC or a PMU of the terminal device, that has a data processing capability and that may control the charging apparatus 200, or may be an executable program installed in the SoC or the PMU. The charging apparatus 200 may be a charging chip of the terminal device, or an executable program installed in the charging chip.

As shown in FIG. 1, the charging control apparatus 100 and the charging apparatus 200 are coupled by using a communications bus. The communications bus may be an inter-integrated circuit (inter-integrated circuit, I2C) bus. Specifically, the charging control apparatus 100 includes a transmission unit 101. The transmission unit 101 may be understood as an interface circuit 101, or may be understood as an executable program that is installed in the charging control apparatus 100 and that is used to drive the interface circuit 101. The transmission unit 101 may send information to or receive information from the charging chip 200 by using the communications bus. In addition, the charging control apparatus 100 further includes an adjustment unit 102. The adjustment unit 102 may be understood as an adjustment circuit 102 in the charging control apparatus 100, and specifically, may be a circuit entity that has a data computation function, such as a processor. Alternatively, the adjustment unit 102 may be understood as an executable program that is installed in the charging control apparatus 100 and that is used for data computation. The adjustment unit 102 may process information received by the transmission unit 101, or may control the transmission unit 101 to send information to the charging apparatus 200.

The charging apparatus 200 mainly includes a control unit 201, a detection unit 202, and a charging unit 203. The control unit 201 is coupled to the charging control apparatus 100, may receive control information sent by the charging control apparatus 100, generate a corresponding control instruction based on the received control information, and send the corresponding control instruction to the charging unit 203. The charging unit 203 is coupled to an external power supply (for example, a charger of the terminal device), may receive an input current (an input voltage) provided by the charger, convert the input current into a charging current (a charging voltage) based on a received control instruction, and then provide the charging current (the charging voltage) for the secondary battery 300. Generally, the control unit 201 may be a processor, a microcontroller, or the like in which program instructions are installed. This is not limited in this embodiment of this application.

In addition, the detection unit 202 is coupled to the secondary battery, to obtain a voltage value of a battery voltage of the secondary battery 300. The control unit 201 includes a register, and the control unit 201 may store, in the register, the voltage value of the battery voltage detected by the detection unit 202. The charging control apparatus 100 may obtain, by reading the register, the voltage value of the battery voltage detected by the charging apparatus 200.

As shown in FIG. 1, the detection unit 202 is further coupled to two ends (an input end and an output end) of a detection resistor Rsense of the secondary battery 300. Specifically, the input end of the detection resistor Rsense is coupled to a negative electrode of the secondary battery 300, and the output end of the detection resistor Rsense is grounded. The detection unit 202 may detect voltage values at the two ends of the detection resistor Rsense, to obtain a voltage value of the detection resistor Rsense. A resistance value of the detection resistor Rsense is preset in the control unit 201. Based on the voltage value of the detection resistor Rsense provided by the detection unit 202 and the resistance value of the battery resistance Rsense, the control unit 201 may calculate a value of a current flowing through the detection resistor Rsense, that is, a current value of a battery current of the secondary battery 300, that is, a current value of a charging current provided for the secondary battery 300.

For example, the detection unit 202 may include a voltmeter. For a specific layout of the voltmeter in the charging apparatus 200, refer to a layout of any voltmeter configured to measure a battery voltage in a conventional technology. This is not specifically limited in this embodiment of this application.

Based on the terminal device shown in FIG. 1, a charging process of the secondary battery is further described below. Currently, a charging technology of the secondary battery is mainly constant current and constant voltage charging. It should be noted that constant current (constant current, CC) charging means that a current value of a charging current does not vary with a voltage value of a charging voltage, but the current value of the constant charging current is generally adjustable. Similarly, constant voltage (constant voltage, CV) charging means that a voltage value of a charging voltage does not vary with a current value of a charging current, but the voltage value of the constant charging voltage is generally adjustable.

Figure 2:
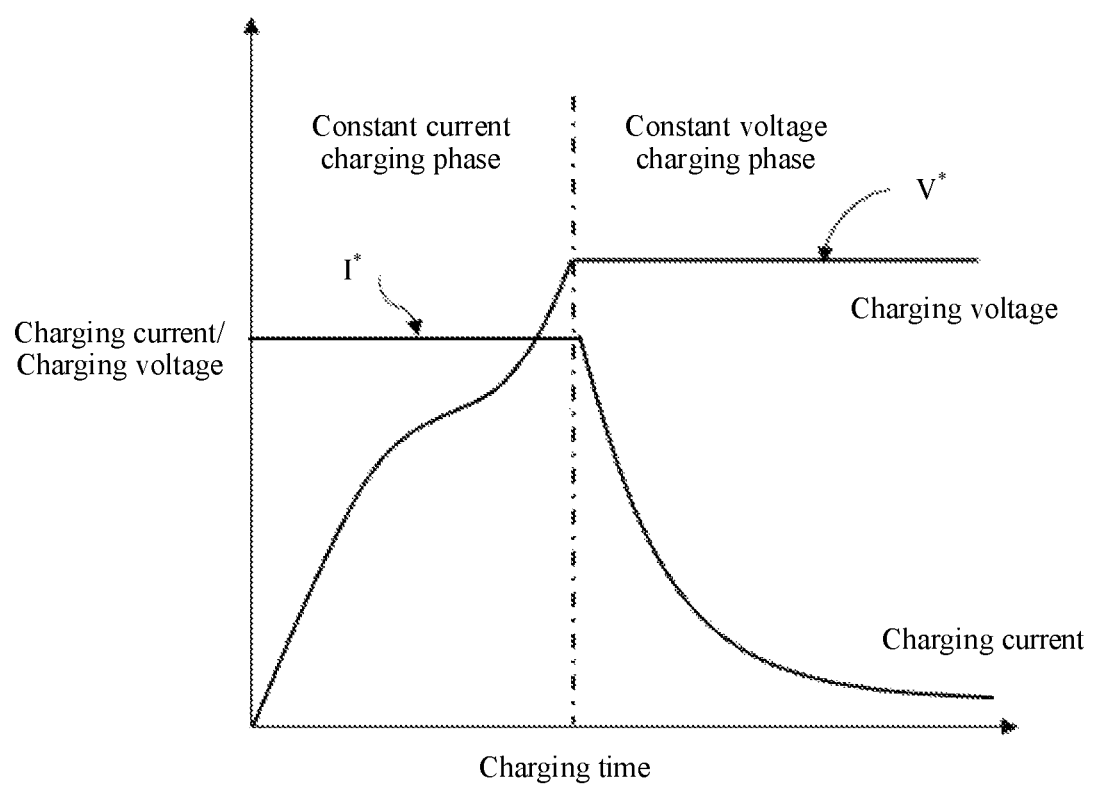
FIG. 2 is a schematic diagram of a charging current and a charging voltage in a constant current and constant voltage charging technology.

Specifically, a charging process of constant current and constant voltage charging may be shown in FIG. 2. First, in a constant current charging phase, the secondary battery is charged by using a constant charging current. Generally, a current value I* of the charging current is relatively large, and may reach 1C to 2C. It should be noted that currently, constant current charging is generally implemented by constantly adjusting a charging voltage.

For example, at a moment to in the constant current charging phase, the charging control apparatus 100 calculates, based on a current voltage value of a battery voltage of the secondary battery 300, a voltage value Va that is of the charging voltage provided by the charging apparatus 200 for the secondary battery 300 and that may enable the current value of the charging current to be I*. In this case, the charging control apparatus 100 sends voltage control information a to the charging apparatus 200, and the voltage control information a may indicate the charging apparatus 200 to adjust the voltage value of the charging voltage applied to the secondary battery 300 to Va. The charging apparatus 200 sends voltage control information to the charging unit 203 based on the received voltage control information a, so that a voltage value of a charging voltage provided by the charging unit 203 is adjusted to Va, thereby enabling a current value of a charging current that is input to the secondary battery 300 is I*.

As time goes on, the battery voltage of the secondary battery 300 changes (gradually increases), and the current value of the charging current also changes (gradually decreases) accordingly. The charging control apparatus 100 keeps monitoring the current value of the charging current of the secondary battery 300. After the current value of the charging current is less than I* by a specific range (for example, more than 1% I*), the charging control apparatus 100 repeats the process of the moment ta, to control the charging voltage provided by the charging apparatus 200 for the secondary battery 300 again. In this way, in the constant current charging phase, the current value of the charging current is maintained to be I* on the whole.

When the battery voltage (equivalent to the charging voltage) of the secondary battery 300 gradually increases to a preset limited charge voltage, as shown in FIG. 2, after the voltage value of the battery voltage reaches a voltage value V* of the limited charge voltage, the charging process enters a constant voltage charging phase. After the constant voltage charging phase is entered, the charging control apparatus 100 controls the charging apparatus 200 to continue to charge the secondary battery by using a constant charging voltage, and a voltage value of the charging voltage is the same as the voltage value of the limited charge voltage, and therefore is also marked by V*. As shown in FIG. 2, in the constant voltage charging phase, the current value of the charging current gradually decreases as time goes on. When the current value of the charging current decreases to a charging cut-off current value (for example, 0.05C), it may be considered that the secondary battery has been fully charged, and in this case, charging may be ended.

The voltage value of the limited charge voltage V* is generally related to a chemical and material system of the secondary battery 300. Current secondary batteries have various types of chemical and material systems. Using a commercial lithium ion battery as an example, negative electrode materials include graphite, silicon carbon, and the like, and positive electrode materials include lithium cobalt oxide, lithium iron phosphate, lithium nickel cobalt manganese oxide, and the like. Secondary batteries in different material systems generally have different limited charge voltages.

Specifically, the limited charge voltage is a safe voltage upper limit that is well known in the industry and that ensures long-term charging and discharging of the battery, depends on a withstand voltage of a material system of the secondary battery, and is mainly related to positive and negative electrode materials, an electrolyte, a membrane, positive and negative electrode current collectors, and the like of the secondary battery. Although a specific value of the limited charge voltage varies with development of a material technology and a processing technology, for secondary batteries in a same material system, even if battery manufacturers are different, a limited charge voltage of a same voltage value is configured for the secondary batteries.

Generally, in a process of charging the secondary battery 300, to prevent overvoltage of the secondary battery 300, the charging voltage of the secondary battery 300 is generally limited to not exceeding the limited charge voltage. The overvoltage of the secondary battery 300 may also be understood as: Because the charging voltage applied to the secondary battery 300 is very high, an irreversible electrochemical reaction occurs in the secondary battery, thereby causing various problems such as irreversible damage to structures of the positive and negative electrode materials of the secondary battery, damage to an SEI film structure, precipitation of lithium metal, generation of a by-product during electrolyte decomposition, accelerated aging of the battery, and a safety hazard. However, in a current constant current and constant voltage charging technology, a constant voltage charging phase generally occupies a lot of charging time, and a relatively small quantity of electricity is put into the secondary battery. This severely limits an overall charging speed of the secondary battery 300. In addition, because charging time in the constant voltage charging phase is relatively long, the secondary battery 300 is in a high voltage state for long time. Consequently, a cycle life of the secondary battery 300 is also damaged accordingly. That is, a quantity of times that the secondary battery 300 may be repeatedly charged and discharged is reduced.

In view of this, the embodiments of this application provide a charging control method and a charging method. The charging control method is applicable to various possible charging control apparatuses, such as a SoC and a PMU. The charging method is applicable to various possible charging apparatuses, such as a charging chip. For ease of description, the charging control method and the charging method are collectively referred to as methods provided in the embodiments of this application below. In the methods provided in the embodiments of this application, the constant voltage charging phase in the current constant current and constant voltage charging technology is replaced with a charging mode in which a current value of a charging current is dynamically adjusted and is gradually reduced in a stepped manner. Specifically, in a process of gradually reducing the charging current in the stepped manner, a charging voltage greater than the limited charge voltage is provided for the secondary battery, to increase an overall charging speed. In addition, overvoltage of the secondary battery is prevented by using the method of reducing the current value of the charging current in the stepped manner.

Then, the electronic device shown in FIG. 1 is used as an example, and the methods provided in the embodiments of this application are further described by using the following specific embodiments. It should be noted that the secondary battery 300 in this application may include a single electrochemical battery cell, a plurality of electrochemical battery cells, a battery pack, or the like. This is not specifically limited in this application.

Embodiment 1

Figure 3:
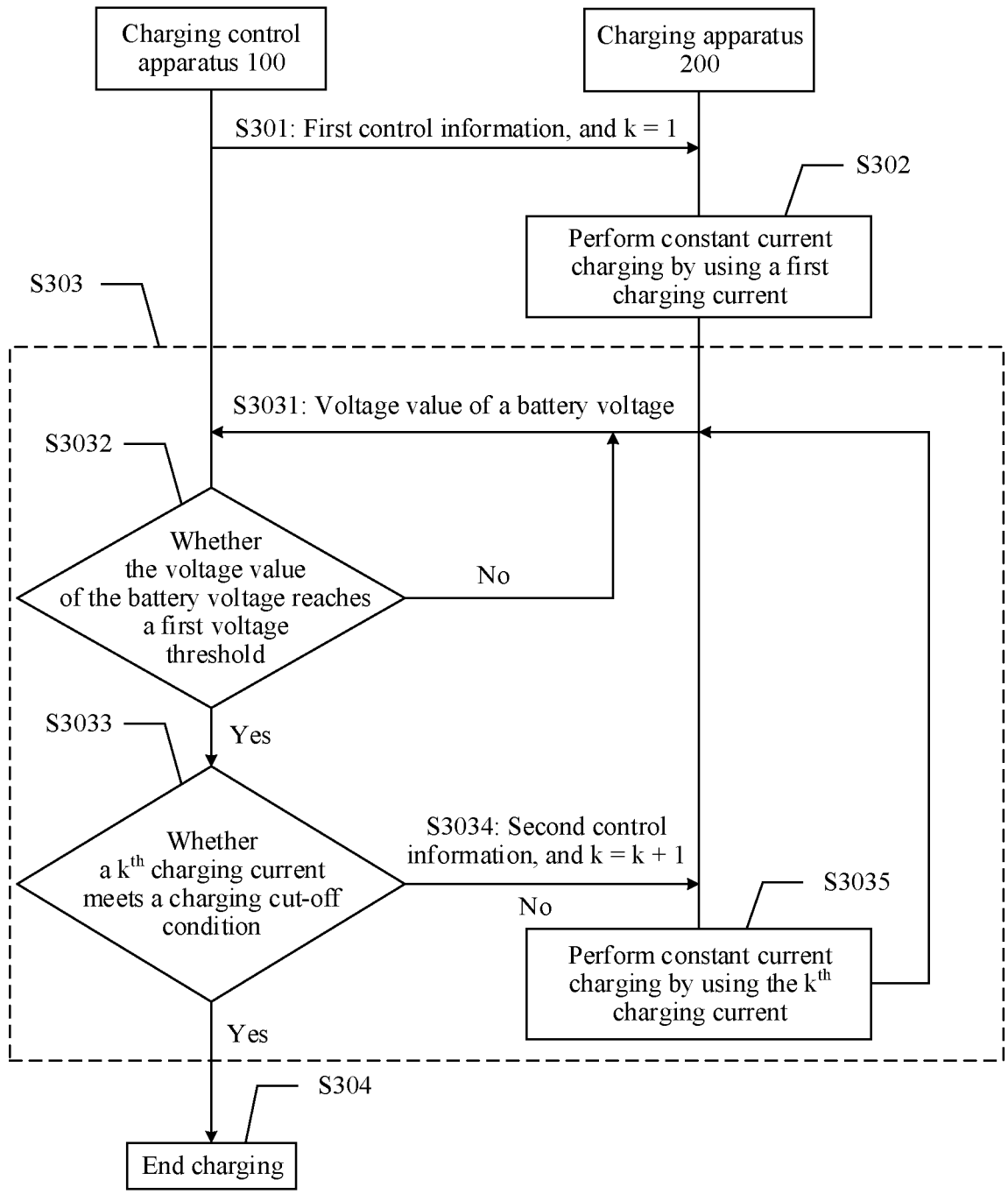
FIG. 3 is a schematic flowchart of a method according to an embodiment of this application.

FIG. 3 is a schematic flowchart of a method according to an embodiment of this application. As shown in FIG. 3, the method mainly includes the following steps:

S301: A charging control apparatus 100 sends first control information to a charging apparatus 200.

S302: The charging apparatus 200 performs constant current charging by using a first charging current based on the first control information.

It should be noted that, as described above, the charging control apparatus 100 needs to send a plurality of pieces of control information to the charging apparatus 200, to implement constant current charging by dynamically adjusting a charging voltage. In view of this, in this application, all control information used to indicate a charging current, such as the first control information and second control information, may be understood as current control information, or may be understood as a plurality of pieces of voltage control information. For example, in S301, the first control information includes a plurality of pieces of voltage control information, and the charging control apparatus 100 sends the first control information to the charging apparatus 200, to dynamically adjust a charging voltage provided by the charging apparatus 200, so that the charging current may be maintained to be the first charging current. Specific implementation of the following control information (the second control information, fourth control information, fifth control information, and the like) used to indicate the charging current is similar to specific implementation of the first control information, and details are not described herein.

S303: The charging control apparatus 100 performs an adjustment step.

As shown in FIG. 3, S303 may be further subdivided into the following steps:

S3031: The charging control apparatus 100 obtains a voltage value of a battery voltage of a secondary battery 300 from the charging apparatus 200. As described above, a register is disposed in a control unit 201 of the charging apparatus 200, and the charging control apparatus 100 may read the voltage value of the battery voltage of the secondary battery 300 from the register of the control unit 201. Details are not described again.

S3032: If the charging control apparatus 100 determines that the voltage value of the battery voltage of the secondary battery 300 reaches a first voltage threshold corresponding to a $k^{th}$ charging current, the charging control apparatus 100 performs S3033. On the contrary, if the charging control apparatus 100 determines that the voltage value of the battery voltage of the secondary battery 300 does not reach the first voltage threshold corresponding to the $k^{th}$ charging current, the charging control apparatus 100 returns to and continues to perform S3031.

It may be understood that, that the voltage value of the battery voltage of the secondary battery 300 reaches the first voltage threshold may also be understood as a meaning that the voltage value of the battery voltage of the secondary battery 300 is not less than the first voltage threshold. Correspondingly, that the voltage value of the battery voltage of the secondary battery 300 does not reach the first voltage threshold may also be understood as a meaning that the voltage value of the battery voltage of the secondary battery 300 is less than the first voltage threshold.

In S3032, the $k^{th}$ charging current is a currently used charging current, and k is a value starting from 1. It should be noted that in this embodiment of this application, each charging current separately corresponds to a first voltage threshold. Specifically, when the first charging current is used to perform constant current charging on the secondary battery 300, in S3032, the charging control apparatus 100 needs to determine that the voltage value of the battery voltage of the secondary battery 300 reaches a first voltage threshold corresponding to the first charging current. When a second charging current is used to perform constant current charging on the secondary battery 300, in S3032, the charging control apparatus 100 needs to determine that the voltage value of the battery voltage of the secondary battery 300 reaches a first voltage threshold corresponding to the second charging current.

In this embodiment of this application, a difference obtained by subtracting a voltage value of a limited charge voltage from the first voltage threshold corresponding to the $k^{th}$ charging current is not greater than a safe voltage difference corresponding to the $k^{th}$ charging current. Specifically, this may be as shown in formula 1 below:

$$Vk - V^* \leq Vsk \quad \text{(Formula 1)}$$

Vk is the first voltage threshold corresponding to the $k^{th}$ charging current, V* is the voltage value of the limited charge voltage, and Vsk is the safe voltage difference corresponding to the $k^{th}$ charging current.

Because the difference obtained by subtracting the voltage value of the limited charge voltage from the first voltage threshold corresponding to the $k^{th}$ charging current is not greater than the safe voltage difference corresponding to the $k^{th}$ charging current, during constant current charging performed on the secondary battery 300 by using the $k^{th}$ charging current, even if the voltage value of the battery voltage of the secondary battery 300 reaches the first voltage threshold corresponding to the $k^{th}$ charging current, overvoltage of the secondary battery 300 may be prevented.

S3033: If the charging control apparatus 100 determines that a $(k+1)^{th}$ charging current meets a charging cut-off condition, the charging control apparatus 100 performs S304 to end charging. On the contrary, if the charging control apparatus 100 determines that the $(k+1)^{th}$ charging current does not meet the charging cut-off condition, the charging control apparatus 100 performs S3034.

In this embodiment of this application, an $(m+1)^{th}$ charging current is used to represent the last charging current provided for the secondary battery 300 in a charging process. For example, a ninth charging current does not meet the charging cut-off condition, and a tenth charging current meets the charging cut-off condition. In this case, a value of m is 9, and the tenth charging current is the last charging current provided for the secondary battery 300.

It may be understood that, in S3033, the charging control apparatus 100 may also determine whether the $(k+1)^{th}$ charging current meets the charging cut-off condition. It is still assumed that the ninth charging current does not meet the charging cut-off condition and the tenth charging current meets the charging cut-off condition. In this case, a value of m is 8, and the ninth charging current is the last charging current provided for the secondary battery 300.

A difference between the foregoing two implementations lies only in that whether the $(k+1)^{th}$ charging current meets the charging cut-off condition is determined before the $(k+1)^{th}$ charging current is used to charge the secondary battery, or whether the $(k+1)^{th}$ charging current meets the charging cut-off condition is determined after the $(k+1)^{th}$ charging current is used to charge the secondary battery. There is no essential difference between the two implementations, and a technical effect of this embodiment of this application is not affected. For ease of description, S3033 shown in FIG. 3 is used as an example for description below in this application.

It is assumed that the $(m+1)^{th}$ charging current is a charging current that meets the charging cut-off condition. In this embodiment of this application, the charging cut-off condition may be expressed as: m+1 is equal to a threshold of a quantity of times; or a current value of the $(m+1)^{th}$ charging current is not greater than a current threshold, and a current value of an $m^{th}$ charging current is greater than the current threshold.

In S3033 shown in FIG. 3, in a possible implementation, a threshold of a quantity of times, for example, 10, is preset in the charging control apparatus 100. That is, when the charging control apparatus 100 performs S3033 during charging of the secondary battery 300 performed by using the tenth charging current, the charging control apparatus 100 may determine that the current tenth charging current meets the charging cut-off condition, and may then perform S304.

In another possible implementation, a current threshold is preset in the charging control apparatus 100. For example, the current threshold in this embodiment of this application may be determined with reference to a charging cut-off current value determined in a current constant current and constant voltage charging technology in a same material system. Generally, decreasing the current threshold increases a capacity of the secondary battery, and increasing the current threshold decreases the capacity of the secondary battery. Using a commercial lithium ion battery as an example, a cut-off current value in the current constant current and constant voltage charging technology is 0.025C. In this embodiment of this application, if the current threshold is set to 0.025C, an obtained capacity of the secondary battery is greater than a capacity of the secondary battery obtained in the current constant current and constant voltage charging technology. In view of this, the current threshold in this embodiment of this application may be set to be slightly greater than 0.025C, for example, may be set to 0.03C, so that after the secondary battery is charged by using the charging method provided in this embodiment of this application, an obtained battery capacity is approximately equal to a battery capacity obtained by using a constant current and constant voltage charging method.

When performing S3033, if the charging control apparatus 100 determines that a current value of the $k^{th}$ charging current is not greater than the current threshold, the charging control apparatus 100 may perform S304. On the contrary, if the charging control apparatus 100 determines that the current value of the $k^{th}$ charging current is greater than the current threshold, the charging control apparatus 100 may continue to perform S3034.

S3034: The charging control apparatus 100 sends second control information to the charging apparatus 200, to indicate the charging apparatus 200 to continue to perform constant current charging on the secondary battery 300 by using the $(k+1)^{th}$ charging current. This may also be understood as a meaning that a value of k in the $k^{th}$ charging current used last time is incremented by 1, that is, k=k+1. For example, when performing S3033, if the charging control apparatus 100 determines that the second charging current does not meet the charging cut-off condition, the charging control apparatus 100 sends the second control information to the charging apparatus 200 in S3034, to indicate the charging apparatus 200 to continue to perform constant current charging by using a third charging current.

S3035: The charging apparatus 200 continues to perform constant current charging by using the $k^{th}$ charging current. It may be understood that the $k^{th}$ charging current herein is actually the $(k+1)^{th}$ charging current in S3032 to S3034. The charging apparatus 200 may continue to detect the voltage value of the battery voltage of the secondary battery 300, so that the method may return to S3031, and the charging control apparatus 100 continues to obtain the voltage value of the battery voltage. In the charging process, S303 is repeatedly performed for a plurality of times until a charging current meets the charging cut-off condition, and then S304 is performed to end charging. For example, the charging control apparatus 100 may send termination information to the charging apparatus 200, and after receiving the termination information, the charging apparatus 200 may stop charging the secondary battery 300 based on the termination information.

It should be noted that, in a process of repeatedly performing S303 for a plurality of times, a current value of a charging current gradually decreases. That is, a current value of the $(k+1)^{th}$ charging current is less than a current value of the $k^{th}$ charging current.

Figure 4:
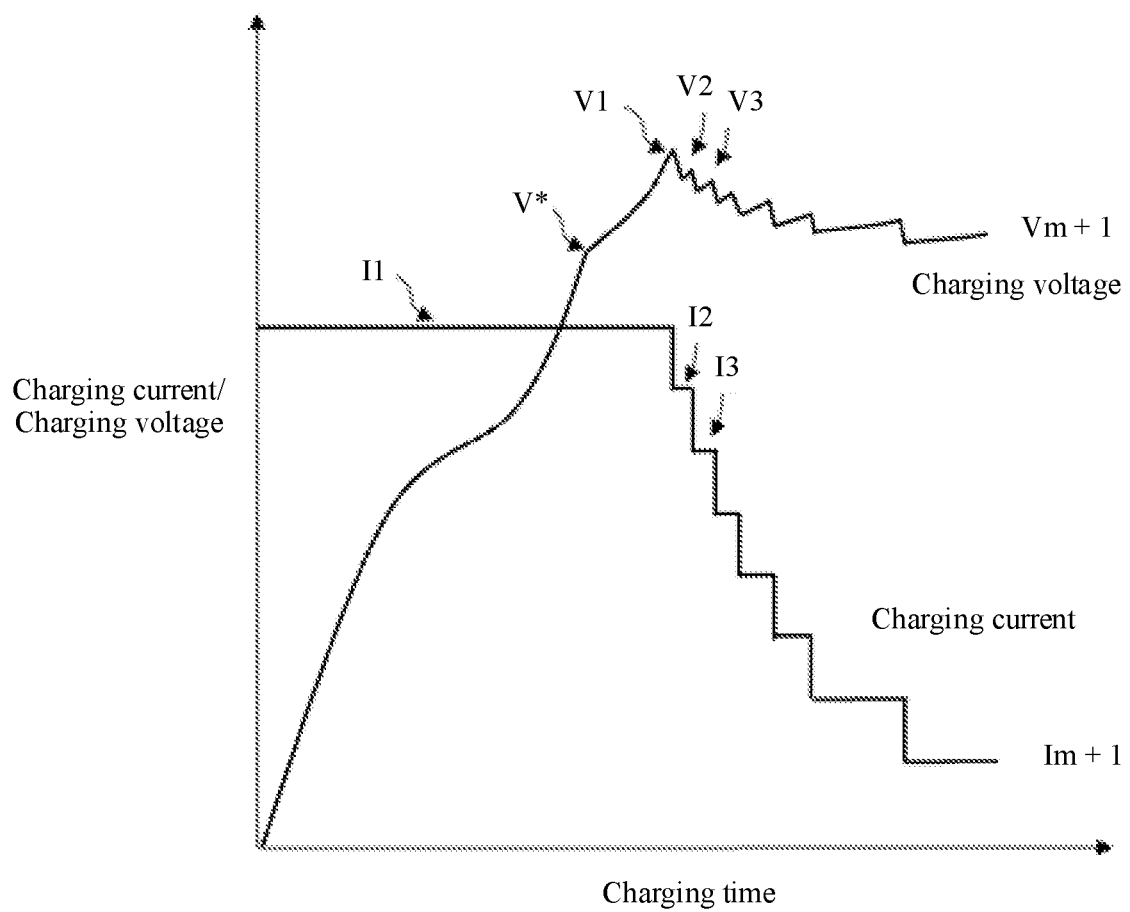
FIG. 4 is a schematic diagram of a charging current and a charging voltage according to an embodiment of this application.

FIG. 4 shows example changes of a charging current and a battery voltage (charging voltage) of the secondary battery 300 in the charging process. As shown in FIG. 4, at an initial stage of starting charging, the charging apparatus 200 provides a first charging current I1 for the secondary battery 300. As charging time extends, the battery voltage of the secondary battery 300 gradually increases to a first voltage threshold V1 corresponding to the first charging current I1. Then, the charging apparatus 200 provides a second charging current I2 for the secondary battery 300, and as the charging time extends, the battery voltage of the secondary battery 300 gradually increases to a first voltage threshold V2 corresponding to the second charging current I2. Then, the charging apparatus 200 provides a third charging current I3 for the secondary battery 300, and as the charging time extends, the battery voltage of the secondary battery 300 gradually increases to a first voltage threshold V3 corresponding to the third charging current I3; . . . ; and the charging apparatus 200 provides an $(m+1)^{th}$ charging current Im+1 for the secondary battery 300, and as the charging time extends, the battery voltage of the secondary battery 300 gradually increases to a first voltage threshold V(m+1) corresponding to the $(m+1)^{th}$ charging current Im+1. Because the $(m+1)^{th}$ charging current Im+1 meets the charging cut-off condition, charging may be ended.

It may be learned from a change of the charging voltage in FIG. 4 that, each time the charging current is changed (changed from the $k^{th}$ charging current to the $(k+1)^{th}$ charging current), the battery voltage of the secondary battery 300 is reduced accordingly. This is because internal resistance of the secondary battery 300 is mainly ohmic resistance, and a decrease in the charging current causes a decrease in a voltage drop due to internal resistance, thereby further causing a decrease in an internal resistance voltage of the secondary battery 300.

It should be noted that, at an initial stage of continuing to perform charging by using the $(k+1)^{th}$ charging current, the battery voltage of the secondary battery 300 needs to be reduced to a minimum value in a specific latency before continuing to increase. This is because a polarizing voltage in the secondary battery 300 also slowly decreases as the charging current decreases.

Therefore, a decreasing process of the battery voltage of the secondary battery 300 needs a specific latency. In view of this, after sending the second control information to the charging apparatus 200, the charging control apparatus 100 may wait for a specific latency before obtaining the voltage value of the battery voltage of the secondary battery 300, to prevent misjudgment.

In this embodiment of this application, the charging control apparatus 100 may indicate the control unit 201 to dynamically configure a cycle for a detection unit 202 by using a clock signal. For example, by increasing a frequency of the clock signal, the control unit 201 may shorten a time interval of detection performed by the detection unit 202; and by decreasing the frequency of the clock signal, may increase the time interval of detection performed by the detection unit 202.

For example, the charging control apparatus 100 may indicate, based on a current battery voltage of the secondary battery 300, the control unit 201 to adjust the time interval of detection performed by the detection unit 202. For example, during constant current charging performed by using the $k^{th}$ charging current, if a difference between a voltage value of the current battery voltage of the secondary battery 300 and the first voltage threshold corresponding to the $k^{th}$ charging current is less than a preset second voltage threshold, that is, the current battery voltage approaches the first voltage threshold corresponding to the $k^{th}$ charging current, in this case, the time interval of detection performed by the detection unit 202 may be shortened, to detect in time that the battery voltage of the secondary battery reaches the first voltage threshold.

The charging method shown in FIG. 3 is used to charge the secondary battery. Because the first voltage threshold corresponding to the $k^{th}$ charging current is greater than the voltage value of the limited charge voltage, a voltage value of the charging voltage provided by the charging apparatus 200 for the secondary battery may be greater than the voltage value V* of the limited charge voltage. This helps increase an overall charging speed and shorten high-voltage charging duration of the secondary battery, compared with the current constant current and constant voltage charging technology. In addition, the difference between the first voltage threshold corresponding to the $k^{th}$ charging current and the voltage value of the limited charge voltage is not greater than the first voltage threshold corresponding to the $k^{th}$ charging current, so that a voltage value of an effective charging voltage in the secondary battery 300 is always less than the voltage value V* of the limited charge voltage, thereby helping prevent overvoltage of the secondary battery. A proportion of the effective charging voltage to the battery voltage gradually increases by gradually decreasing the current value of the charging current, to gradually complete charging.

In addition, in this embodiment of this application, the current value of the charging current is dynamically adjusted, so that the voltage value of the effective charging voltage in the secondary battery 300 is always less than the voltage value V* of the limited charge voltage. It is easier for a person skilled in the art to adjust the current value of the charging current. In addition, adjustment precision and an adjustment speed of the charging current are higher, thereby helping reduce costs of the charging apparatus 200 and improve charging safety.

Embodiment 2

As described in Embodiment 1, a current value of a $(k+1)^{th}$ charging current is less than a current value of a $k^{th}$ charging current. In a method provided in this embodiment of this application, a charging control apparatus 100 may obtain the current value of the $(k+1)^{th}$ charging current in at least one or more of the following manners.

For example, in a possible implementation, the charging control apparatus 100 may obtain the current value of the $(k+1)^{th}$ charging current based on a preset amplitude. For example, the current value of the $k^{th}$ charging current is 200 mA, and the preset reduction amplitude is 40 mA. In this case, the charging control apparatus 100 may obtain the current value 160 mA of the $(k+1)^{th}$ charging current.

In another possible implementation, the charging control apparatus 100 may determine a reduction amplitude corresponding to a current interval to which the current value I* of the $k^{th}$ charging current belongs, and obtain the current value of the $(k+1)^{th}$ charging current based on the reduction amplitude. For example, a correspondence between a current interval and a reduction amplitude is preset in the charging control apparatus 100. For example, the correspondence may be shown in Table 1 below:

TABLE 1

| Current interval (mA) | Reduction amplitude (mA) |
|---|---|
| [600, 400) | 100 |
| [400, 200) | 50 |
| [200, 0] | 30 |

As shown in Table 1, it is assumed that the current value of the $k^{th}$ charging current is 60 mA, a current interval in which the current value of the $k^{th}$ charging current is located is [45, 30), and a corresponding reduction amplitude is 10 mA. In this case, the current value of the $(k+1)^{th}$ charging current is 50 mA. In Table 1, as a median of the current interval decreases, the reduction amplitude corresponding to the current interval also decreases gradually. This is because, when the current value of the charging current is relatively high, a charging speed of a secondary battery 300 is relatively fast, and if the reduction amplitude is relatively small, in a subsequent process of continuing to perform charging by using the $(k+1)^{th}$ charging current, a battery voltage quickly reaches a first voltage threshold corresponding to the $(k+1)^{th}$ charging current. Consequently, the charging control apparatus 100 needs to frequently update the charging current and a first voltage threshold corresponding to the charging current.

In still another possible implementation, as shown in FIG. 1, the charging apparatus 200 may further include a temperature detection unit, for example, a temperature detection resistor R2, and the temperature detection resistor R2 is disposed adjacent to the secondary battery 300. A resistance value of the temperature detection resistor R2 varies with a temperature. The charging apparatus 200 may detect a current battery temperature of the secondary battery 300 based on a resistance value change of the temperature detection resistor R2, so that the charging control apparatus 100 may read, from the charging apparatus 200, the battery temperature detected by the charging apparatus 200.

In view of this, the charging control apparatus 100 may determine, based on the battery temperature of the secondary battery 300, a reduction amplitude corresponding to a temperature interval in which the battery temperature is located, and reduce the current value of the charging current based on the reduction amplitude. For example, a correspondence between a temperature interval and a reduction amplitude is preset in the charging control apparatus 100. For example, the correspondence may be shown in Table 2 below:

TABLE 2

| Temperature interval (° C.) | Reduction amplitude (mA) |
|---|---|
| [45, 30) | 100 |
| [30, 20) | 50 |
| [20, 10) | 100 |
| [10, 0] | 150 |

As shown in Table 2, a reduction amplitude corresponding to a range of 20° C. to 30° C. is smallest, and as a median of the temperature interval increases or decreases, the reduction amplitude corresponding to the temperature interval increases accordingly. This is because, when the battery temperature of the secondary battery 300 is relatively high, an electrochemical reaction inside the secondary battery 300 is relatively active, a charging speed is relatively fast, and if the reduction amplitude is relatively small, in a subsequent process of continuing to perform charging by using the $(k+1)^{th}$ charging current, a battery voltage quickly reaches a first voltage threshold corresponding to the $(k+1)^{th}$ charging current. Consequently, the charging control apparatus 100 needs to frequently update the charging current and a first voltage threshold corresponding to the charging current. When the battery temperature is relatively low, a speed of a lithium intercalation reaction inside the secondary battery 300 is relatively slow, and electricity is difficult to be put into the battery. This causes precipitation of lithium metal inside the secondary battery 300, thereby negatively affecting the secondary battery 300. Therefore, the current needs to be rapidly reduced.

In a possible implementation, as shown in FIG. 1, the charging apparatus 200 may further include a warning unit 205. The warning unit 205 may provide alarm information for a user. For example, the warning unit 205 may be a display or an indicator. After obtaining the battery temperature of the secondary battery 300, the charging control apparatus 100 may further compare the battery temperature with a preset temperature threshold (for example, 60° C.). If the battery temperature is greater than the temperature threshold, the charging control apparatus 100 may send an alarm instruction to the charging apparatus 200. After receiving the alarm instruction, a control unit 201 may control, based on the alarm instruction, the warning unit 205 to send alarm information, to remind the user to stop charging in time. If the battery temperature of the secondary battery 300 is relatively high, it indicates that there may be currently a problem such as battery aging or an internal short-circuit in the secondary battery 300. In this case, alarm information is sent to remind the user to stop charging, thereby helping prevent damage to an internal structure of the secondary battery 300 and protect safety of the secondary battery 300.

Embodiment 3

As described above, a $k^{th}$ charging current corresponds to a first voltage threshold, and k is a value starting from 1. Then, the first voltage threshold corresponding to the $k^{th}$ charging current is further described.

In a possible implementation, research and development personnel may obtain, through statistics based on a large amount of experimental data, a safe voltage difference corresponding to the $k^{th}$ charging current. For example, during charging of the secondary battery 300 performed by using the $k^{th}$ charging current, a voltage value of a battery voltage when overvoltage occurs in the secondary battery 300 is determined by performing a plurality of experiments. Then, sample data used to measure the safe voltage difference is obtained based on a difference between the voltage value of the battery voltage and a voltage value of a limited charge voltage. The safe voltage difference that corresponds to the $k^{th}$ charging current and that is applicable to most secondary batteries 300 may be obtained through statistics by performing a plurality of experiments. Whether overvoltage occurs in the secondary battery 300 may be determined by using an analysis method or through modeling and simulation.

In another possible implementation, the safe voltage difference corresponding to the $k^{th}$ charging current may alternatively be obtained based on a voltage value of a voltage drop due to internal resistance of the secondary battery 300 when the secondary battery 300 is charged by using the $k^{th}$ charging current.

Specifically, the secondary battery 300 has specific internal resistance due to factors such as a manufacturing technology and a battery material, and existence of the internal resistance of the battery leads to a voltage drop due to internal resistance. That is, a voltage obtained by subtracting the voltage drop due to internal resistance from a charging voltage provided by a charging apparatus 200 is an effective charging voltage for driving an energy storage reaction of the secondary battery 300. Generally, overvoltage may occur in the secondary battery 300 only when the effective charging voltage reaches the limited charge voltage.

In view of this, when the battery voltage of the secondary battery 300 reaches the limited charge voltage, the effective charging voltage in the secondary battery 300 is still less than the limited charge voltage. Therefore, the battery voltage of the secondary battery 300 may further increase on the basis of the limited charge voltage.

Using the $k^{th}$ charging current Ik as an example, a difference between the first voltage threshold corresponding to the charging current Ik and the voltage value V* of the limited charge voltage is not greater than the safe voltage difference corresponding to the charging current Ik. The safe voltage difference corresponding to the charging current Ik may be the voltage value ΔVk of the voltage drop due to internal resistance of the secondary battery when the secondary battery is charged by using the charging current Ik. For example, the first voltage threshold Vk corresponding to the charging current Ik may meet formula 2 below:

$$V^* < Vk \leq Vk + V^* \qquad \text{(Formula 2)}$$

Embodiment 4

As shown in FIG. 4, in this embodiment of this application, a first voltage threshold corresponding to a first charging current is greater than a limited charge voltage V*. In addition, a larger current value of the first charging current leads to a larger first voltage threshold corresponding to the first charging current (refer to formula 2), which may exceed a critical voltage value of a battery protection board. However, if the current value of the first charging current is smaller, a battery voltage of a secondary battery 300 increases more slowly. This is not conducive to increasing a charging speed of the secondary battery 300.

Figure 5:
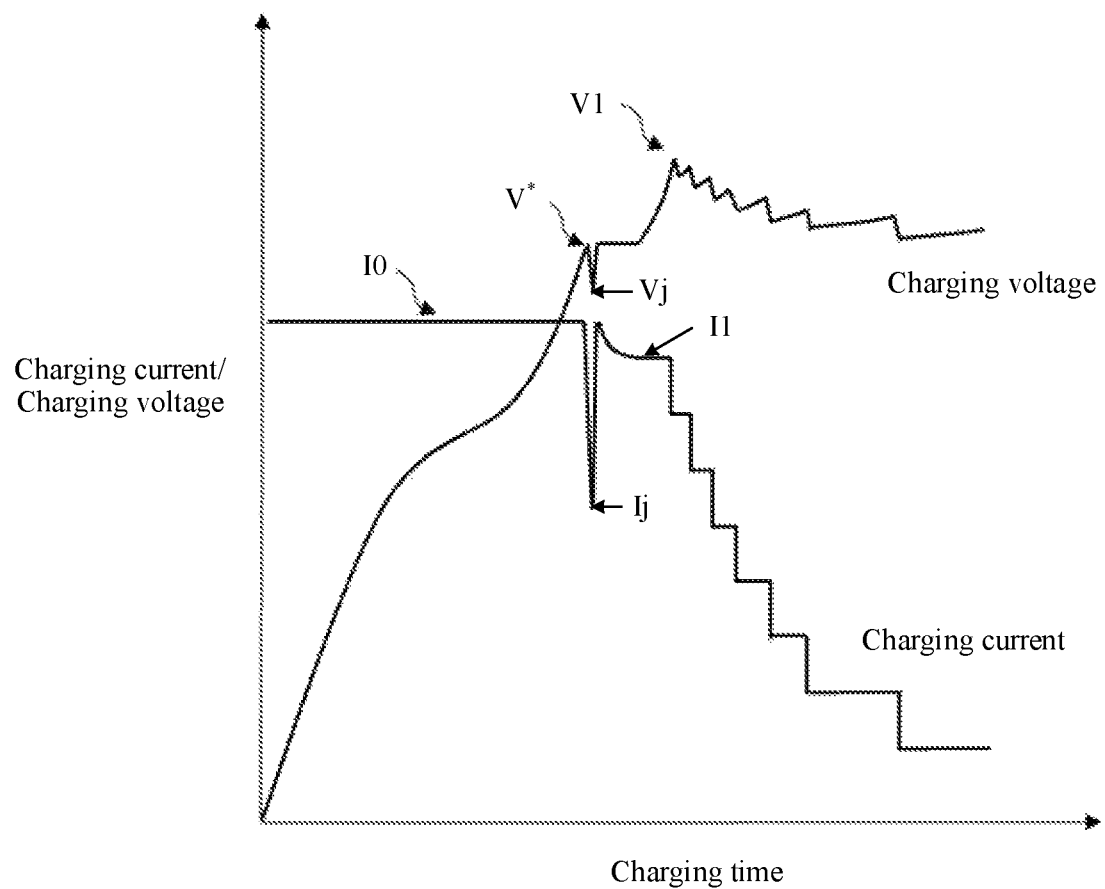
FIG. 5 is a schematic diagram of a charging current and a charging voltage according to an embodiment of this application.

In view of this, as shown in FIG. 5, a charging control apparatus 100 may further send startup information to a charging apparatus 200 at an initial stage of starting charging. The startup information may indicate the charging apparatus 200 to perform constant current charging on the secondary battery by using a charging current I0 of a preset current value, and the preset current value is not less than the current value of the first charging current. The charging control apparatus 100 obtains a voltage value of the battery voltage of the secondary battery from the charging apparatus 200, and sends first control information to the charging apparatus after determining that the voltage value of the secondary battery 300 reaches the limited charge voltage V*.

Because the current value of the charging current I0 is not less than the current value of the first charging current I1, the battery voltage of the secondary battery 300 may rapidly increase to the limited charge voltage V* by using the charging current I0 to perform constant current charging at the initial stage of starting charging, to increase the charging speed of the secondary battery 300. After determining that the voltage value of the battery voltage of the secondary battery 300 reaches the limited charge voltage V*, the charging control apparatus 100 continues to charge the secondary battery 300 by using the first charging current with a smaller current value, so that the first voltage threshold V1 corresponding to the first charging current may be reduced, thereby helping further prevent overvoltage of the battery.

For example, in a possible implementation, after determining that the voltage value of the battery voltage reaches the limited charge voltage V*, the charging control apparatus 100 may directly send the first control information, to control the charging apparatus 200 to continue to perform constant current charging on the secondary battery 300 by using the first charging current.

In another possible implementation, after determining that the voltage value of the battery voltage reaches the limited charge voltage V*, the charging control apparatus 100 may alternatively send third control information to the charging apparatus 200. The third control information is used to indicate the charging apparatus 200 to continue to perform constant voltage charging on the secondary battery 300 by using a charging voltage whose voltage value is V*, as shown in FIG. 5. As charging time of constant voltage charging extends, the current value of the charging current gradually decreases from the charging current I0. After the current value of the charging current decreases to I1, the charging control apparatus 100 sends the first control information to the charging apparatus 200, to control the charging apparatus 200 to continue to perform constant current charging on the secondary battery 300 by using the first charging current.

Embodiment 5

As described above, a first voltage threshold corresponding to a $k^{th}$ charging current may be calculated based on an internal resistance value of a secondary battery 300. Generally, internal resistance of the secondary battery 300 mainly includes ohmic resistance. Therefore, there is a linear correlation relationship between the internal resistance of the battery and a voltage drop of the battery. For example, a voltage value of a voltage drop due to internal resistance may be a product of the internal resistance value of the battery and a current value of a charging current.

That is, a charging control apparatus 100 may obtain the internal resistance value of the secondary battery 300; calculate, based on the internal resistance value of the secondary battery 300 and a current value of the $k^{th}$ charging current, a voltage value of a voltage drop due to internal resistance of the secondary battery 300 when the secondary battery 300 is charged by using the $k^{th}$ charging current; and calculate, based on the voltage value of the voltage drop due to internal resistance of the secondary battery 300 and a voltage value of a limited charge voltage, the first voltage threshold corresponding to the $k^{th}$ charging current.

In a possible implementation, the internal resistance value of the secondary battery 300 may be preset in the charging control apparatus 100. In a charging process, the charging control apparatus 100 may directly read the preset internal resistance value, and calculate, based on the current value of the $k^{th}$ charging current and the read internal resistance value, the voltage drop due to internal resistance of the secondary battery 300 when the secondary battery 300 is charged by using the $k^{th}$ charging current, to obtain the first voltage threshold corresponding to the $k^{th}$ charging current.

Specifically, the current value of the $k^{th}$ charging current may be a theoretical current value of the $k^{th}$ charging current to be used by the charging apparatus 200 to perform constant current charging under control of the charging control apparatus 100, or may be an actual current value of the $k^{th}$ charging current obtained by the charging control apparatus 100 from the charging apparatus 200. This is not limited in this embodiment of this application.

Repeated charging and discharging of the secondary battery 300 causes a specific change in the internal resistance value of the secondary battery 300. In view of this, in another possible implementation, the charging control apparatus 100 may further control the charging apparatus 200 to apply a preset current or voltage waveform to the secondary battery 300 before a voltage value of a battery voltage of the secondary battery 300 exceeds the voltage value of the limited charge voltage, to obtain a current internal resistance value of the secondary battery 300.

For example, as shown in FIG. 5, when the voltage value of the battery voltage reaches V* (or before the voltage value of the battery voltage reaches V*), the charging control apparatus 100 obtains a current voltage value of the battery voltage of the secondary battery 300, such as V* in the figure. The charging control apparatus 100 sends fourth control information to the charging apparatus 200, to control the charging apparatus 200 to continue to perform constant current charging by using a charging current Ij, and a current value of the charging current Ij is less than a current value of a first charging current I1. Because the current value of the charging current decreases, the voltage drop due to internal resistance of the secondary battery 300 also decreases. Consequently, the voltage value of the battery voltage of the secondary battery 300 decreases from V* to Vj. The charging control apparatus 100 obtains a current voltage value Vj of the battery voltage of the secondary battery 300, and calculates the internal resistance value of the secondary battery based on a difference ΔIj between the current value of the first charging current I1 and the current value of the charging current Ij, and a difference ΔVj between the voltage value V* and the voltage value Vj. For example, the internal resistance value of the secondary battery may be calculated based on formula 2 below:

$$r = \Delta Vj / \Delta Ij \qquad \text{(Formula 2)}$$

r is the internal resistance value of the secondary battery.

The internal resistance value of the secondary battery 300 may be more accurately detected by using the foregoing method, thereby helping overcome a problem that the internal resistance value of the secondary battery 300 varies with an increase in a quantity of charging and discharging times. In a possible implementation, the charging control apparatus 100 may further continuously detect the internal resistance value of the secondary battery 300 for a plurality of times, and calculate or update the first voltage threshold based on an average value of internal resistance values detected for a plurality of times.

In a possible implementation, a trusted internal resistance range, for example, [Rmin, Rmax], may be further preset in the charging control apparatus 100. Rmin is a minimum value of the internal resistance value, and Rmax is a maximum value of the internal resistance value. Rmin and Rmax may be obtained based on experience, experimental statistics, or the like, and are used to represent a change range of the internal resistance value of the secondary battery 300 when the secondary battery 300 can normally work (and/or be normally charged). After calculating the internal resistance value r of the secondary battery, the charging control apparatus 100 may further determine whether the internal resistance value r belongs to the trusted internal resistance range [Rmin, Rmax]. If the internal resistance value r belongs to the trusted internal resistance range [Rmin, Rmax], the internal resistance value r is trusted. In a subsequent charging process, the internal resistance value r may be used to calculate the first voltage threshold corresponding to the $k^{th}$ charging current. If the internal resistance value r does not belong to the trusted internal resistance range [Rmin, Rmax], the internal resistance value of the secondary battery may be detected again, until a trusted internal resistance value that belongs to the trusted internal resistance range [Rmin, Rmax] is detected.

In a possible implementation, if internal resistance values r detected by the charging control apparatus 100 for a preset quantity of consecutive times are all greater than Rmax, it indicates that a problem such as battery aging or an internal short-circuit may occur in the secondary battery 300 at this time. In this case, the charging control apparatus 100 may alternatively send an alarm instruction to the charging apparatus 200, to indicate the charging apparatus 200 to send alarm information to a user by using a warning unit 205, to remind the user to stop charging in time.

It should be noted that, in the foregoing implementation, after obtaining the voltage value Vj, the charging control apparatus 100 may further send fifth control information to the charging apparatus 200, to control the charging apparatus 200 to resume charging of the secondary battery 300.

Specifically, in a first possible case:

When the battery voltage of the secondary battery 300 does not reach the limited charge voltage V*, the charging control apparatus 100 controls the charging apparatus 200 to perform constant current charging by using a charging current I0, and after the battery voltage of the secondary battery 300 reaches the limited charge voltage V*, controls the charging apparatus 200 to perform constant current charging by using the first charging current.

In this case, when the battery voltage of the secondary battery 300 does not reach the limited charge voltage V*, if the charging control apparatus 100 controls the charging apparatus 200 to perform constant current charging by using the charging current whose current value is Ij, the charging control apparatus 100 sends fifth control information after obtaining the voltage value Vj. The fifth control information may indicate the charging apparatus 200 to continue to perform constant current charging by using the charging current I0.

When the battery voltage of the secondary battery 300 reaches the limited charge voltage V*, if the charging control apparatus 100 controls the charging apparatus 200 to perform constant current charging by using the charging current whose current value is Ij, the charging control apparatus 100 sends fifth control information after obtaining the voltage value Vj. The fifth control information may indicate the charging apparatus 200 to continue to perform constant current charging on the secondary battery 300 by using the first charging current, or may indicate the charging apparatus 200 to perform constant voltage charging on the secondary battery 300 by using a charging voltage whose voltage value is V*. For a subsequent process, refer to Embodiment 1 to Embodiment 4, and details are not described herein.

In a second possible case:

Before the battery voltage of the secondary battery 300 reaches a first voltage threshold corresponding to the first charging current, the charging control apparatus 100 controls the charging apparatus 200 to continuously perform constant current charging on the secondary battery 300 by using the first charging current. In this case, the charging control apparatus 100 sends fifth control information after obtaining the voltage value Vj, and the fifth control information may indicate the charging apparatus 200 to continue to perform constant current charging on the secondary battery 300 by using the first charging current. For a subsequent process, refer to Embodiment 1 to Embodiment 4, and details are not described herein.

It may be understood that the foregoing two implementations of obtaining the internal resistance value may be used in combination. For example, in the second possible implementation, if a control unit 201 still does not detect a trusted internal resistance value after the voltage value of the battery voltage of the secondary battery exceeds the voltage value V* of the limited charge voltage, the preset internal resistance value may be read, and the first voltage threshold corresponding to the $k^{th}$ charging current may be calculated based on the preset internal resistance value and the current value of the $k^{th}$ charging current.

Obviously, a person skilled in the art can make various modifications and variations to this application without departing from the spirit and scope of this application. This application is intended to cover these modifications and variations of this application provided that they fall within the scope of the following claims of this application and their equivalent technologies.

What is claimed is:

1. A charging control method, comprising:
sending first control information to a charging apparatus, wherein the first control information is used to command the charging apparatus to charge a secondary battery using a first charging current;
sequentially performing an adjustment step for each of a plurality of charging currents, wherein the adjustment step comprises:
obtaining a voltage value of a battery voltage of the secondary battery detected by the charging apparatus; and
sending second control information to the charging apparatus after the voltage value of the battery voltage of the secondary battery reaches a first voltage threshold corresponding to a $k^{th}$ charging current,
wherein the second control information is used to indicate the charging apparatus to continue to perform constant current charging on the secondary battery by using a $(k+1)^{th}$ charging current; a current value of the $(k+1)^{th}$ charging current is less than a current value of the $k^{th}$ charging current,
wherein the first voltage threshold corresponding to the $k^{th}$ charging current is greater than a limited charge voltage, and a difference obtained by subtracting a voltage value of the limited charge voltage from the first voltage threshold corresponding to the $k^{th}$ charging current is not greater than a safe voltage difference corresponding to the $k^{th}$ charging current; k is each positive integer from 1 to m, and a current value of an $(m+1)^{th}$ charging current meets a charging cut-off condition; and
wherein the current value of the $(k+1)^{th}$ charging current is obtained based on the following method:
determining the current value of the $(k+1)^{th}$ charging current based on a preset proportion;
determining a reduction amplitude corresponding to a current interval to which the current value of the $k^{th}$ charging current belongs, and determining the current value of the $(k+1)^{th}$ charging current based on the reduction amplitude; or
obtaining a battery temperature of the secondary battery, determining a reduction amplitude corresponding to a temperature interval in which the battery temperature is located, and determining the current value of the $(k+1)^{th}$ charging current based on the reduction amplitude; and
sending termination information to the charging apparatus, wherein the termination information is used to indicate the charging apparatus to end charging.

2. The method according to claim 1, wherein the safe voltage difference corresponding to the $k^{th}$ charging current is obtained based on a voltage value of a voltage drop due to internal resistance of the secondary battery when the secondary battery is charged by using the $k^{th}$ charging current.

3. The method according to claim 1, wherein the charging cut-off condition comprises:
m+1 is equal to a threshold of a quantity of times; or
the current value of the $(m+1)^{th}$ charging current is not greater than a current threshold, and a current value of an $m^{th}$ charging current is greater than the current threshold.

4. The method according to claim 1, wherein before the sending first control information to a charging apparatus, the method further comprises:
   sending startup information to the charging apparatus, wherein the startup information is used to indicate the charging apparatus to perform constant current charging on the secondary battery by using a charging current of a preset current value, and the preset current value is not less than a current value of the first charging current;
   obtaining the voltage value of the battery voltage of the secondary battery; and
   sending the first control information to the charging apparatus after determining that the voltage value of the secondary battery reaches the limited charge voltage.

5. The method according to claim 4, wherein the sending the first control information to the charging apparatus after determining that the voltage value of the secondary battery reaches the limited charge voltage comprises:
   sending third control information to the charging apparatus after determining that the voltage value of the battery voltage reaches the voltage value of the limited charge voltage, wherein the third control information is used to indicate the charging apparatus to perform constant voltage charging on the secondary battery by using a first charging voltage, and a voltage value of the first charging voltage is the voltage value of the limited charge voltage; and
   sending the first control information to the charging apparatus after determining that a current value of a current charging current drops to the current value of the first charging current.

6. The method according to claim 4, wherein before the voltage value of the battery voltage of the secondary battery exceeds the voltage value of the limited charge voltage, the method further comprises:
   obtaining an internal resistance value of the secondary battery;
   calculating, based on the internal resistance value of the secondary battery and the current value of the first charging current, a voltage value of a voltage drop due to internal resistance of the secondary battery when the secondary battery is charged by using the first charging current; and
   calculating, based on the voltage value of the voltage drop due to internal resistance of the secondary battery and the voltage value of the limited charge voltage, the first voltage threshold corresponding to the first charging current.

7. The method according to claim 2, wherein the first voltage threshold corresponding to the $k^{th}$ charging current is obtained based on the following method:
   calculating, based on the internal resistance value of the secondary battery and the current value of the $k^{th}$ charging current, the voltage value of the voltage drop due to internal resistance of the secondary battery when the secondary battery is charged by using the $k^{th}$ charging current; and
   calculating, based on the voltage value of the voltage drop due to internal resistance of the secondary battery and the voltage value of the limited charge voltage, the first voltage threshold corresponding to the $k^{th}$ charging current.

8. A charging control apparatus, comprising a transmission unit and an adjustment unit, wherein
   the transmission unit is configured to send first control information to a charging apparatus, wherein the first control information is used to indicate the charging apparatus to perform constant current charging on a to-be-charged secondary battery by using a first charging current;
   the adjustment unit is configured to: sequentially perform an adjustment step for each of a plurality of charging currents, and
   wherein each adjustment step comprises:
      obtaining, by using the transmission unit, a voltage value of a battery voltage of the secondary battery detected by the charging apparatus; and
      after the voltage value of the battery voltage of the secondary battery reaches a first voltage threshold corresponding to a $k^{th}$ charging current, controlling the transmission unit to send second control information to the charging apparatus,
      wherein the second control information is used to indicate the charging apparatus to continue to perform constant current charging on the secondary battery by using a $(k+1)^{th}$ charging current; a current value of the $(k+1)^{th}$ charging current is less than a current value of the $k^{th}$ charging current, the first voltage threshold corresponding to the $k^{th}$ charging current is greater than a limited charge voltage, and a difference obtained by subtracting a voltage value of the limited charge voltage from the first voltage threshold corresponding to the $k^{th}$ charging current is not greater than a safe voltage difference corresponding to the $k^{th}$ charging current; k is each positive integer from 1 to m, and a current value of an $(m+1)^{th}$ charging current meets a charging cut-off condition;
   wherein the current value of the $(k+1)^{th}$ charging current is obtained based on the following method:
      determining the current value of the $(k+1)^{th}$ charging current based on a preset proportion;
      determining a reduction amplitude corresponding to a current interval to which the current value of the $k^{th}$ charging current belongs, and determining the current value of the $(k+1)^{th}$ charging current based on the reduction amplitude; or
      obtaining a battery temperature of the secondary battery, determining a reduction amplitude corresponding to a temperature interval in which the battery temperature is located, and determining the current value of the $(k+1)^{th}$ charging current based on the reduction amplitude; and
   wherein the transmission unit is further configured to send termination information to the charging apparatus, wherein the termination information is used to indicate the charging apparatus to end charging.

9. The apparatus according to claim 8, wherein the safe voltage difference corresponding to the $k^{th}$ charging current is obtained based on a voltage value of a voltage drop due to internal resistance of the secondary battery when the secondary battery is charged by using the $k^{th}$ charging current.

10. The apparatus according to claim 8, wherein the charging cut-off condition comprises:
   m+1 is equal to a threshold of a quantity of times; or
   the current value of the $(m+1)^{th}$ charging current is not greater than a current threshold, and a current value of an $m^{th}$ charging current is greater than the current threshold.

11. The apparatus according to claim 8, wherein the transmission unit is further configured to:
   send startup information to the charging apparatus, wherein the startup information is used to indicate the charging apparatus to perform constant current charging on the secondary battery by using a charging current of a preset current value, and the preset current value is not less than a current value of the first charging current; and the adjustment unit is further configured to:
obtain the voltage value of the battery voltage of the secondary battery by using the transmission unit; and
after determining that the voltage value of the secondary battery reaches the limited charge voltage, control the transmission unit to send the first control information to the charging apparatus.

12. The apparatus according to claim 11, wherein the adjustment unit is specifically configured to:
after determining that the voltage value of the battery voltage reaches the voltage value of the limited charge voltage, control the transmission unit to send third control information to the charging apparatus, wherein the third control information is used to indicate the charging apparatus to perform constant voltage charging on the secondary battery by using a first charging voltage, and a voltage value of the first charging voltage is the voltage value of the limited charge voltage; and
after determining that a current value of a current charging current drops to the current value of the first charging current, control the transmission unit to send the first control information to the charging apparatus.

13. The apparatus according to claim 11, wherein the adjustment unit is further configured to:
obtain an internal resistance value of the secondary battery;
calculate, based on the internal resistance value of the secondary battery and the current value of the first charging current, a voltage value of a voltage drop due to internal resistance of the secondary battery when the secondary battery is charged by using the first charging current; and
calculate, based on the voltage value of the voltage drop due to internal resistance of the secondary battery and the voltage value of the limited charge voltage, the first voltage threshold corresponding to the first charging current.

14. The apparatus according to claim 9, wherein the first voltage threshold corresponding to the $k^{th}$ charging current is obtained based on the following method:
calculating, based on the internal resistance value of the secondary battery and the current value of the $k^{th}$ charging current, the voltage value of the voltage drop due to internal resistance of the secondary battery when the secondary battery is charged by using the $k^{th}$ charging current; and
calculating, based on the voltage value of the voltage drop due to internal resistance of the secondary battery and the voltage value of the limited charge voltage, the first voltage threshold corresponding to the $k^{th}$ charging current.

15. A charging control apparatus, comprising an interface circuit and an adjustment circuit, wherein:
the interface circuit is configured to send first control information to a charging apparatus, wherein the first control information is used to indicate the charging apparatus to perform constant current charging on a to-be-charged secondary battery by using a first charging current;

the adjustment circuit is configured to sequentially perform an adjustment step for each of a plurality of charging currents, wherein the adjustment step comprises:
obtaining, by using the interface circuit, a voltage value of a battery voltage of the secondary battery detected by the charging apparatus; and
after the voltage value of the battery voltage of the secondary battery reaches a first voltage threshold corresponding to a $k^{th}$ charging current, controlling the interface circuit to send second control information to the charging apparatus,
wherein the second control information is used to indicate the charging apparatus to continue to perform constant current charging on the secondary battery by using a $(k+1)^{th}$ charging current; a current value of the $(k+1)^{th}$ charging current is less than a current value of the $k^{th}$ charging current,
wherein the first voltage threshold corresponding to the $k^{th}$ charging current is greater than a limited charge voltage, and a difference obtained by subtracting a voltage value of the limited charge voltage from the first voltage threshold corresponding to the $k^{th}$ charging current is not greater than a safe voltage difference corresponding to the $k^{th}$ charging current; k is each positive integer from 1 to m, and a current value of an $(m+1)^{th}$ charging current meets a charging cut-off condition; and
wherein the current value of the $(k+1)^{th}$ charging current is obtained based on the following method:
determining the current value of the $(k+1)^{th}$ charging current based on a preset proportion;
determining a reduction amplitude corresponding to a current interval to which the current value of the $k^{th}$ charging current belongs, and determining the current value of the $(k+1)^{th}$ charging current based on the reduction amplitude; or
obtaining a battery temperature of the secondary battery, determining a reduction amplitude corresponding to a temperature interval in which the battery temperature is located, and determining the current value of the $(k+1)^{th}$ charging current based on the reduction amplitude; and
the interface circuit is further configured to send termination information to the charging apparatus, wherein the termination information is used to indicate the charging apparatus to end charging.

16. The apparatus according to claim 15, wherein the safe voltage difference corresponding to the $k^{th}$ charging current is obtained based on a voltage value of a voltage drop due to internal resistance of the secondary battery when the secondary battery is charged by using the $k^{th}$ charging current.

17. The apparatus according to claim 15, wherein the charging cut-off condition comprises:
m+1 is equal to a threshold of a quantity of times; or
the current value of the $(m+1)^{th}$ charging current is not greater than a current threshold, and a current value of an $m^{th}$ charging current is greater than the current threshold.

18. The apparatus according to claim 15, wherein the interface circuit is further configured to:
send startup information to the charging apparatus, wherein the startup information is used to indicate the charging apparatus to perform constant current charging on the secondary battery by using a charging current of a preset current value, and the preset current value is not less than a current value of the first charging current; and the adjustment circuit is further configured to:

obtain the voltage value of the battery voltage of the secondary battery by using the interface circuit; and after determining that the voltage value of the secondary battery reaches the limited charge voltage, control the interface circuit to send the first control information to the charging apparatus.

19. The apparatus according to claim 18, wherein the adjustment circuit is specifically configured to:

after determining that the voltage value of the battery voltage reaches the voltage value of the limited charge voltage, control the interface circuit to send third control information to the charging apparatus, wherein the third control information is used to indicate the charging apparatus to perform constant voltage charging on the secondary battery by using a first charging voltage, and a voltage value of the first charging voltage is the voltage value of the limited charge voltage; and after determining that a current value of a current charging current drops to the current value of the first charging current, control the interface circuit to send the first control information to the charging apparatus.

20. The apparatus according to claim 18, wherein the adjustment circuit is further configured to:

obtain an internal resistance value of the secondary battery;

calculate, based on the internal resistance value of the secondary battery and the current value of the first charging current, a voltage value of a voltage drop due to internal resistance of the secondary battery when the secondary battery is charged by using the first charging current; and calculate, based on the voltage value of the voltage drop due to internal resistance of the secondary battery and the voltage value of the limited charge voltage, the first voltage threshold corresponding to the first charging current.

21. The apparatus according to claim 16, wherein the first voltage threshold corresponding to the $k^{th}$ charging current is obtained based on the following method:

calculating, based on the internal resistance value of the secondary battery and the current value of the $k^{th}$ charging current, the voltage value of the voltage drop due to internal resistance of the secondary battery when the secondary battery is charged by using the $k^{th}$ charging current; and calculating, based on the voltage value of the voltage drop due to internal resistance of the secondary battery and the voltage value of the limited charge voltage, the first voltage threshold corresponding to the $k^{th}$ charging current.

* * * * *